US012676809B2

(12) United States Patent
Zhao et al.

(10) Patent No.: US 12,676,809 B2
(45) Date of Patent: Jul. 7, 2026

(54) COMMUNICATION SYSTEM, METHOD, AND APPARATUS

(71) Applicant: HUAWEI TECHNOLOGIES CO., LTD., Shenzhen (CN)

(72) Inventors: Mingyu Zhao, Shanghai (CN); Xueqiang Yan, Shanghai (CN); Jianjun Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 18/420,401

(22) Filed: Jan. 23, 2024

(65) Prior Publication Data

US 2024/0163198 A1     May 16, 2024

Related U.S. Application Data

(63) Continuation of application No. PCT/CN2022/091268, filed on May 6, 2022.

(30) Foreign Application Priority Data

Jul. 27, 2021     (CN) .......................... 202110851439.5

(51) Int. Cl.
H04L 45/02          (2022.01)
(52) U.S. Cl.
CPC .................................... H04L 45/02 (2013.01)
(58) Field of Classification Search
CPC .......................................................... H04L 45/02
USPC .......................................................... 709/238
See application file for complete search history.

(56) References Cited

U.S. PATENT DOCUMENTS

| | | | |
|---|---|---|---|
| 2021/0157848 A1* | 5/2021 | Doshi .................... | G06F 16/907 |
| 2022/0083393 A1* | 3/2022 | Yang ...................... | G06F 9/5072 |
| 2022/0345442 A1* | 10/2022 | Lee .......................... | H04L 67/10 |

FOREIGN PATENT DOCUMENTS

| | | | | |
|---|---|---|---|---|
| CN | 202110772275 | * | 8/2021 | ......... H04L 67/1004 |
| WO | 2020232720 A1 | | 11/2020 | |
| WO | 2021136335 A1 | | 7/2021 | |

* cited by examiner

*Primary Examiner* — Ario Etienne
*Assistant Examiner* — Kidest Mendaye
(74) *Attorney, Agent, or Firm* — Rimon PC

(57)     ABSTRACT

A communication system, method, and apparatus are provided. The communication system includes a first edge cloud deploying first group of user service nodes (USNs) that form a hash ring corresponding to the first edge cloud and a second edge cloud deploying a second group of USNs that form a hash ring corresponding to the second edge cloud. A USN is configured to provide a service for a terminal device corresponding to the USN. The communication system may further include a mapping system including one or more distributed mapping nodes that store information about the USNs on the first and second edge cloud. The information about a USN includes identification information of the USN and identification information of the terminal device corresponding to the USN. When the mapping system includes a plurality of distributed mapping nodes, the mapping nodes form one or more hash rings corresponding to the mapping system.

18 Claims, 14 Drawing Sheets

Process of generating identification information of a USN

Example of the identification information of the USN

Terminal device

Network device

Switch

Application

Network service node NSN

User service node USN

S2

S1     DMS     S3

Sn

M2N80     Edge cloud

Core cloud

EID 1

M1N31

Edge cloud

Edge cloud

EID 1

USN 160

Transceiver module 1601

Processing module 1602

COMMUNICATION SYSTEM, METHOD, AND APPARATUS

CROSS-REFERENCE TO RELATED APPLICATIONS

This application is a continuation of International Application No. PCT/CN2022/091268, filed on May 6, 2022, which claims priority to Chinese Patent Application No. 202110851439.5, filed on Jul. 27, 2021. The disclosures of the aforementioned applications are hereby incorporated by reference in their entireties.

TECHNICAL FIELD

This application relates to the field of communication technologies, and in particular, to a communication system, method, and apparatus.

BACKGROUND

Currently, a peer to peer (P2P) network connects network nodes head to tail to form a logical ring. The P2P network may determine a space based on a hash function (for example, a SHA-1 function). Each integer in the space may be a node identifier, and the node identifiers may be sequentially arranged clockwise to form the logical ring.

For example, the P2P network may process internet protocol (IP) addresses of the network nodes based on the hash function to obtain the node identifiers, and sequentially arrange the node identifiers clockwise on the logical ring based on the values of the node identifiers.

However, because the logical ring is obtained by sequencing the node identifiers based on the values of the node identifiers obtained after hash transformation, two nodes that are extremely close or adjacent on the logical ring may be far away from each other in an actual physical network. As a result, information about one node needs to be transmitted around a long path or almost an entire circle to reach the other node, causing a large delay.

SUMMARY

In view of the problem described above, embodiments of this application provide a communication system, method, and apparatus, to expect to reduce a large delay.

According to a first aspect, an embodiment of this application provides a communication system including a first edge cloud on which a first group of user service nodes (USNs) are deployed and a second edge cloud on which a second group of USNs are deployed. The first group of USNs form a hash ring corresponding to the first edge cloud, and the second group of USNs form a hash ring corresponding to the second edge cloud. A USN is configured to provide a service for a terminal device corresponding to the USN.

Based on the first aspect, the first group of USNs on the first edge cloud form the hash ring corresponding to the first edge cloud, the second group of USNs on the second edge cloud form the hash ring corresponding to the second edge cloud, and the first edge cloud and the second edge cloud correspond to different hash rings. Because USNs on a same hash ring are deployed on a same edge cloud, a physical distance between the USNs on the same hash ring is relatively short. That USNs deployed on different edge clouds correspond to different hash rings can alleviate a detour problem when a distance between the USNs on the same hash ring is short, but an actual physical distance is long, to reduce a communication delay.

In a possible design, the communication system further includes a mapping system. The mapping system includes one or more distributed mapping nodes. When the mapping system includes a plurality of distributed mapping nodes, the plurality of distributed mapping nodes form one or more hash rings corresponding to the mapping system. The one or more distributed mapping nodes in the mapping system store information about the USNs on the first edge cloud and the second edge cloud, where the information about a USN includes identification information of the USN and identification information of the terminal device corresponding to the USN.

Based on one embodiment design, the mapping system may be a system architecture corresponding to one hash ring, or may be a cascaded system architecture corresponding to a plurality of hash rings. When the mapping system uses the cascaded system architecture, if a change of a distributed mapping node causes a change of a network topology of the mapping system, the routing information stored in another distributed mapping node on a hash ring on which the distributed mapping node that is changed is located may be modified, and the routing information stored in a distributed mapping node on another hash ring does not need to be modified. This reduces routing overheads, and reduces storage load of the distributed mapping node. In addition, the distributed mapping node in the mapping system stores information about the USNs on each edge cloud, so that each USN can quickly find, based on the mapping system when performing data transmission, a destination USN corresponding to a destination terminal device, to send data to the destination terminal device via the destination USN.

In a possible design, the first group of USNs include a first USN and a second USN, and the second group of USNs include a third USN and a fourth USN. The first USN stores one or more of the following information: information about the second USN, information about the third USN, or information about the fourth USN. The information about the USN includes the identification information of the USN and the identification information of the terminal device corresponding to the USN.

Based on this possible design, the first USN may store the information about the second USN located on the same edge cloud as the first USN, or may store the information about the third USN and/or the fourth USN located on an edge cloud different from the edge cloud on which the first USN is located. In other words, each USN may pre-store information about some or all of USNs in the communication system, so that a destination USN corresponding to a destination terminal device is quickly queried based on the locally stored USN information. This reduces a querying delay.

In a possible design, the identification information of the USN includes first identification information and second identification information, where the first identification information indicates information about an edge cloud to which the USN belongs, and the second identification information indicates identity information of the USN.

Based on this possible design, the identification information of the USN may indicate the information about the edge cloud to which the USN belongs, so that the USN determines, based on identification information of a destination USN, whether the USN and the destination USN are located on a same edge cloud. If the USN and the destination USN are located on the same edge cloud, intra-domain routing based on a hash ring may be used; otherwise, inter-domain routing based on a channel between the edge clouds may be used.

According to a second aspect, an embodiment of this application provides a communication method. The method includes: a first user service node USN receives first information that is from a first terminal device and that includes identification information of a second terminal device, and determines, based on the identification information of the second terminal device, identification information of a USN corresponding to the second terminal device, where the first USN belongs to a first group of USNs deployed on a first edge cloud, and the first group of USNs form a hash ring corresponding to the first edge cloud. When the USN corresponding to the second terminal device is a second USN that belongs to the first group of USNs, the first USN sends the first information to the second USN through the hash ring corresponding to the first edge cloud. When the USN corresponding to the second terminal device is a third USN, the first USN sends the first information to the third USN through a channel between the first edge cloud and a second edge cloud and a hash ring corresponding to the second edge cloud, where the third USN belongs to a second group of USNs deployed on the second edge cloud, and the second group of USNs form the hash ring corresponding to the second edge cloud.

Based on the second aspect, the first group of USNs on the first edge cloud may form the hash ring corresponding to the first edge cloud, the second group of USNs on the second edge cloud may form the hash ring corresponding to the second edge cloud, the first edge cloud and the second edge cloud correspond to different hash rings, and different edge clouds may correspond to different hash rings. The first USN may determine, based on the identification information of the second terminal device, the USN corresponding to the second terminal device. When the USN corresponding to the second terminal device is the second USN that belongs to the same edge cloud as the first USN, the first USN may send the first information to the second USN in an intra-domain routing manner that is based on a hash ring. When the USN corresponding to the second terminal device is the third USN that belongs to an edge cloud different from the edge cloud to which the first USN belongs, the first USN may send the first information to the third USN in an inter-domain routing manner that is based on a channel between the edge clouds. Because the USNs on a same hash ring are deployed on a same edge cloud, a physical distance between the USNs on the same hash ring is short. Compared with that USNs deployed on all edge clouds correspond to a same hash ring, that the USNs deployed on different edge clouds correspond to different hash rings can reduce a detour problem when a distance between the USNs on the same hash ring is short but an actual physical distance is long, to reduce communication delay.

In a possible design, the first USN determines, based on prestored information, the identification information of the USN corresponding to the second terminal device, where the information about the USN includes the identification information of the second terminal device and the identification information of the USN corresponding to the second terminal device.

Based on this possible design, the first USN may quickly query, in a local querying manner based on the prestored information about the USN, for the identification information of the USN corresponding to the second terminal device, to reduce a querying delay.

In a possible design, the first USN sends, to a distributed mapping node, request information that includes the identification information of the second terminal device, where the request information requests the identification information of the USN corresponding to the second terminal device, and the distributed mapping node belongs to a mapping system. The first USN receives a response message that is from the distributed mapping node and that includes the identification information of the USN corresponding to the second terminal device.

Based on this possible design, when the first USN does not find, through local querying, the identification information of the USN corresponding to the second terminal device, the first USN may further send the request information to the distributed mapping node, to query, based on the mapping system, for the information about the USN corresponding to the second terminal device.

In a possible design, the identification information of the USN includes first identification information and second identification information, where the first identification information indicates information about an edge cloud to which the USN belongs, and the second identification information indicates identity information of the USN.

Based on this possible design, the identification information of the USN may indicate the information about the edge cloud to which the USN belongs, so that the first USN determines, based on the identification information of the USN corresponding to the second terminal device, whether the first USN and the USN corresponding to the second terminal device are located on a same edge cloud. If the first USN and the USN corresponding to the second terminal device are located on the same edge cloud, intra-domain routing based on a hash ring may be used; otherwise, inter-domain routing based on the channel between the edge clouds may be used.

In a possible design, the first USN sends the first information to the USN on the second edge cloud through the channel between the first edge cloud and the second edge cloud, to enable the USN to send the first information to the third USN through the hash ring corresponding to the second edge cloud.

Based on this possible design, when an inter-domain routing manner is used, the first USN may send the first information to any USN on the second edge cloud through the channel between the first edge cloud and the second edge cloud, or send the first information to a specified USN on the second edge cloud. The USN or the specified USN may send the first information to the third USN through the hash ring corresponding to the second edge cloud. This provides a feasible solution for the first USN to send the first information to the third USN in an inter-domain routing manner.

In a possible design, the first USN obtains identification information of a fourth USN, where the fourth USN is a USN to which the first terminal device is handed over, and the fourth USN belongs to the second group of USNs. The first USN sends user information of the first terminal device to the fourth USN through the channel between the first edge cloud and the second edge cloud and the hash ring corresponding to the second edge cloud.

Based on this possible design, after the first terminal device is handed over from the first USN to the fourth USN, the first USN may send the user information of the first terminal device to the fourth USN, and the fourth USN may better provide a service for the first terminal device based on the user information of the first terminal device.

According to a third aspect, an embodiment of this application provides a first USN. The first USN may implement a function performed by the first USN in the foregoing second aspect or the possible designs of the second aspect, and the function may be implemented by hardware executing corresponding software. The hardware and/or the software includes one or more modules corresponding to the foregoing functions, for example, a transceiver module and a processing module. The transceiver module is configured to receive first information that is sent from a first terminal device and that includes the identification information of a second terminal device, where the first USN belongs to a first group of USNs deployed on a first edge cloud, and the first group of USNs form a hash ring corresponding to the first edge cloud. The processing module is configured to determine, based on the identification information of the second terminal device, identification information of a USN corresponding to the second terminal device. When the USN corresponding to the second terminal device is a second USN that belongs to the first group of USNs. The transceiver module is further configured to send the first information to the second USN through the hash ring corresponding to the first edge cloud. When the USN corresponding to the second terminal device is a third USN, the transceiver module is further configured to send the first information to the third USN through a channel between the first edge cloud and a second edge cloud and a hash ring corresponding to the second edge cloud, where the third USN belongs to a second group of USNs deployed on the second edge cloud, and the second group of USNs form the hash ring corresponding to the second edge cloud.

In a possible design, the processing module is configured to determine, based on prestored information about a USN, the identification information of the USN corresponding to the second terminal device, where the information about the USN includes the identification information of the second terminal device and the identification information of the USN corresponding to the second terminal device.

In a possible design, the transceiver module is further configured to send, to a distributed mapping node, request information that includes the identification information of the second terminal device, where the request information requests the identification information of the USN corresponding to the second terminal device, and the distributed mapping node belongs to a mapping system. The transceiver module is further configured to receive a response message that is from the distributed mapping node and that includes the identification information of the USN corresponding to the second terminal device.

In a possible design, the identification information of the USN includes first identification information and second identification information, where the first identification information indicates information about an edge cloud to which the USN belongs, and the second identification information indicates identity information of the USN.

In a possible design, the transceiver module is configured to send the first information to the USN on the second edge cloud through the channel between the first edge cloud and the second edge cloud, to enable the USN to send the first information to the third USN through the hash ring corresponding to the second edge cloud.

In a possible design, the transceiver module is further configured to obtain identification information of a fourth USN, where the fourth USN is a USN to which the first terminal device is handed over, and the fourth USN belongs to the second group of USNs. The transceiver module is further configured to send user information of the first terminal device to the fourth USN through the channel between the first edge cloud and the second edge cloud and the hash ring corresponding to the second edge cloud.

It should be noted that for a specific implementation of the first USN, further refer to a behavior function of the first USN in the communication method provided in any one of the second aspect or the possible designs of the second aspect. For a technical effect brought by the first USN, refer to the technical effect brought by any one of the possible designs of the foregoing second aspect. Details are not described again.

According to a fourth aspect, an embodiment of this application provides a first USN. In one implementation, the first USN may be a device, or a chip or a system-on-a-chip. In another implementation, this application provides an apparatus. The apparatus may be a first USN, or a chip or a system-on-a-chip in the first USN. The first USN may be the first USN, or a chip or a system-on-a-chip in the first USN. The first USN may implement a function performed by the first USN in the foregoing aspects or the possible designs, and the function may be implemented by hardware. In a possible design, the first USN may include a transceiver and a processor. The transceiver and the processor may be configured to support the first USN in implementing the function in any one of the foregoing second aspect or the possible designs of the second aspect. For example, the transceiver may be configured to receive first information that is from a first terminal device and that includes identification information of a second terminal device, where the first USN belongs to a first group of USNs deployed on a first edge cloud, and the first group of USNs form a hash ring corresponding to the first edge cloud. The processor may be configured to determine, based on the identification information of the second terminal device, the identification information of a USN corresponding to the second terminal device. When the USN corresponding to the second terminal device is a second USN that belongs to the first group of USNs, the transceiver may be further configured to send the first information to the second USN through the hash ring corresponding to the first edge cloud. When the USN corresponding to the second terminal device is a third USN, the transceiver may be further configured to send the first information to the third USN through a channel between the first edge cloud and a second edge cloud and a hash ring corresponding to the second edge cloud, where the third USN belongs to a second group of USNs deployed on the second edge cloud, and the second group of USNs forms the hash ring corresponding to the second edge cloud. In another possible design, the first USN may further include a memory. The memory is configured to store computer-executable instructions and data that are necessary for the first USN. When the first USN runs, the transceiver and the processor execute the computer-executable instructions stored in the memory, to enable the first USN to perform the communication method in any one of the foregoing second aspect or the possible designs of the second aspect.

For a specific implementation of the first USN in the fourth aspect, refer to a behavior function of the first USN in the communication method provided in any one of the second aspect or the possible designs of the second aspect.

According to a fifth aspect, an embodiment of this application provides a communication method. The method includes: a fourth user service node (USN) receives user information that is from a first USN and that is of a first terminal device, where the first USN is a USN from which the first terminal device is handed over, and the fourth USN is a USN to which the first terminal device is handed over. The first USN belongs to a first group of USNs deployed on a first edge cloud, the first group of USNs forms a hash ring corresponding to the first edge cloud, the fourth USN belongs to a second group of USNs deployed on a second edge cloud, and the second group of USNs forms a hash ring corresponding to the second edge cloud. The fourth USN sends, to a distributed mapping node, second information that includes identification information of the fourth USN and identification information of the first terminal device, where the distributed mapping node belongs to a mapping system.

Based on the fifth aspect, after the first terminal device is handed over from the first USN to the fourth USN, the fourth USN may obtain the user information of the first terminal device, so that the fourth USN better provides a service for the first terminal device based on the user information of the first terminal device. In addition, the fourth USN may further send the second information to the distributed mapping node, and the distributed mapping node may update a USN corresponding to the first terminal device from the first USN to the fourth USN.

According to a sixth aspect, an embodiment of this application provides a fourth USN. The fourth USN may implement a function performed by the fourth USN in the foregoing fifth aspect or the possible designs of the fifth aspect, and the function may be implemented by hardware executing corresponding software. The hardware and/or the software includes one or more modules corresponding to the foregoing functions, for example, a transceiver module. The transceiver module may be configured to receive user information that is from a first USN and that is of a first terminal device, where the first USN is a USN from which the first terminal device is handed over, and the fourth USN is a USN to which the first terminal device is handed over. The first USN belongs to a first group of USNs deployed on a first edge cloud, the first group of USNs forms a hash ring corresponding to the first edge cloud, the fourth USN belongs to a second group of USNs deployed on a second edge cloud, and the second group of USNs forms a hash ring corresponding to the second edge cloud. The transceiver module may be further configured to send, to a distributed mapping node, second information that includes identification information of the fourth USN and identification information of the first terminal device, where the distributed mapping node belongs to a mapping system.

It should be noted that for a specific implementation of the fourth USN, further refer to a behavior function of the fourth USN in the communication method provided in any one of the fifth aspect or the possible designs of the fifth aspect. For a technical effect brought by the fourth USN, refer to the technical effect brought by any one of the possible designs of the foregoing fifth aspect. Details are not described again.

According to a seventh aspect, an embodiment of this application provides a fourth USN. The fourth USN may be a device, or a chip or a system-on-a-chip. The fourth USN may implement a function performed by the fourth USN in the foregoing aspects or the possible designs, and the function may be implemented by hardware. In a possible design, the fourth USN may include a transceiver. The transceiver may be configured to support the fourth USN in implementing the function in any one of the foregoing fifth aspect or the possible designs of the fifth aspect. For example, the transceiver may be configured to receive user information that is from a first USN and that is of a first terminal device, where the first USN is a USN from which the first terminal device is handed over and the fourth USN is a USN to which the first terminal device is handed over. The first USN belongs to a first group of USNs deployed on a first edge cloud, the first group of USNs forms a hash ring corresponding to the first edge cloud, the fourth USN belongs to a second group of USNs deployed on a second edge cloud, and the second group of USNs forms a hash ring corresponding to the second edge cloud. The transceiver may be further configured to send, to a distributed mapping node, second information that includes identification information of the fourth USN and identification information of the first terminal device, where the distributed mapping node belongs to a mapping system. In another possible design, the fourth USN may further include a processor and a memory. The memory is configured to store computer-executable instructions and data that are necessary for the fourth USN. When the fourth USN runs, the transceiver and the processor execute the computer-executable instructions stored in the memory, to enable the fourth USN to perform the communication method in any one of the foregoing fifth aspect or the possible designs of the fifth aspect.

For a specific implementation of the fourth USN in the seventh aspect, refer to a behavior function of the fourth USN in the communication method provided in any one of the fifth aspect or the possible designs of the fifth aspect.

According to an eighth aspect, an embodiment of this application provides a communication method. The method includes: A distributed mapping node receives second information that is from a fourth user service node USN and that includes identification information of the fourth USN and identification information of a first terminal device, where the distributed mapping node belongs to a mapping system, and the fourth USN is a USN to which the first terminal device is handed over. The fourth USN belongs to a second group of USNs deployed on a second edge cloud, and the second group of USNs form a hash ring corresponding to the second edge cloud. The distributed mapping node updates the identification information of a USN corresponding to the first terminal device from the identification information of a first USN to the identification information of the fourth USN, where the first USN is a USN from which the first terminal device is handed over. The first USN belongs to a first group of USNs deployed on a first edge cloud, and the first group of USNs form a hash ring corresponding to the first edge cloud.

Based on the eighth aspect, after the first terminal device is handed over from the first USN to the fourth USN, the distributed mapping node may obtain the second information sent by the fourth USN, to update, based on the second information, the USN corresponding to the first terminal device from the first USN to the fourth USN.

According to a ninth aspect, an embodiment of this application provides a distributed mapping node. The distributed mapping node may implement a function performed by the distributed mapping node in the foregoing eighth aspect or the possible designs of the eighth aspect, and the function may be implemented by hardware executing corresponding software. The hardware or the software includes one or more modules corresponding to the foregoing functions, for example, a transceiver module and a processing module. The transceiver module is configured to receive second information that is from a fourth user service node USN and that includes identification information of the fourth USN and identification information of a first terminal device, where the distributed mapping node belongs to a mapping system, the fourth USN is a USN to which the first terminal device is handed over, the fourth USN belongs to a second group of USNs deployed on a second edge cloud, and the second group of USNs form a hash ring corresponding to the second edge cloud. The processing module is configured to update identification information of a USN corresponding to the first terminal device from identification information of a first USN to the identification information of the fourth USN, where the first USN is a USN from which the first terminal device is handed over, the first USN belongs to a first group of USNs deployed on a first edge cloud, and the first group of USNs form a hash ring corresponding to the first edge cloud.

It should be noted that for a specific implementation of the distributed mapping node, further refer to a behavior function of the distributed mapping node in the communication method provided in any one of the eighth aspect or the possible designs of the eighth aspect. For a technical effect brought by the distributed mapping node, still refer to the technical effect brought by any one of the possible designs of the foregoing eighth aspect. Details are not described again.

According to a tenth aspect, an embodiment of this application provides a distributed mapping node. The distributed mapping node may be a device, or a chip or a system-on-a-chip. The distributed mapping node may implement a function performed by the distributed mapping node in the foregoing aspects or the possible designs, and the function may be implemented by hardware. In a possible design, the distributed mapping node may include a transceiver and a processor. The transceiver and the processor may be configured to support the distributed mapping node in implementing the function in any one of the foregoing eighth aspect or the possible designs of the eighth aspect. For example, the transceiver may be configured to receive second information that is from a fourth user service node USN and that includes identification information of the fourth USN and identification information of a first terminal device, where the distributed mapping node belongs to a mapping system, and the fourth USN is a USN to which the first terminal device is handed over. The fourth USN belongs to a second group of USNs deployed on a second edge cloud, and the second group of USNs forms a hash ring corresponding to the second edge cloud. The processor may be configured to update the identification information of the USN corresponding to the first terminal device from identification information of a first USN to the identification information of the fourth USN, where the first USN is a USN from which the first terminal device is handed over, the first USN belongs to a first group of USNs deployed on a first edge cloud, and the first group of USNs forms a hash ring corresponding to the first edge cloud. In another possible design, the distributed mapping node may further include a memory. The memory is configured to store computer-executable instructions and data that are necessary for the distributed mapping node. When the distributed mapping node runs, the transceiver and the processor execute the computer-executable instructions stored in the memory, to enable the distributed mapping node to perform the communication method in any one of the foregoing eighth aspect or the possible designs of the eighth aspect.

For a specific implementation of the distributed mapping node in the tenth aspect, refer to a behavior function of the distributed mapping node in the communication method provided in any one of the eighth aspect or the possible designs of the eighth aspect.

According to an eleventh aspect, a communication apparatus is provided. The communication apparatus includes one or more processors, and the one or more processors are configured to run a computer program or instructions. When the one or more processors execute the computer program or the instructions, the communication apparatus is enabled to perform the communication method in any one of the second aspect or the possible designs of the second aspect, perform the communication method in any one of the fifth aspect or the possible designs of the fifth aspect, or perform the communication method in any one of the eighth aspect or the possible designs of the eighth aspect.

In a possible design, the communication apparatus further includes one or more communication interfaces. The one or more communication interfaces are coupled to the one or more processors, and the one or more communication interfaces are configured to communicate with a module other than the communication apparatus.

In a possible design, the communication apparatus further includes one or more memories, the one or more memories are coupled to the one or more processors, and the one or more memories are configured to store the foregoing computer program or instructions. In a possible implementation, the memory is located outside the communication apparatus. In another possible implementation, the memory is located inside the communication apparatus. In some embodiments of this application, the processor and the memory may alternatively be integrated into one component. In other words, the processor and the memory may alternatively be integrated together.

According to a twelfth aspect, a communication apparatus is provided. The communication apparatus includes an interface circuit and a logic circuit, and the interface circuit is coupled to the logic circuit. The logic circuit is configured to perform the communication method in any one of the second aspect or the possible designs of the second aspect, perform the communication method in any one of the fifth aspect or the possible designs of the fifth aspect, or perform the communication method in any one of the eighth aspect or the possible designs of the eighth aspect. The interface circuit is configured to communicate with a module other than the communication apparatus.

According to a thirteenth aspect, a computer-readable storage medium is provided. The computer-readable storage medium stores computer instructions or a program, and when the computer instructions or the program is run on a computer, the computer is enabled to perform the communication method in any one of the second aspect or the possible designs of the second aspect, perform the communication method in any one of the fifth aspect or the possible designs of the fifth aspect, or perform the communication method in any one of the eighth aspect or the possible designs of the eighth aspect.

According to a fourteenth aspect, a computer program product that includes computer instructions is provided. When the computer program product runs on a computer, the computer is enabled to perform the communication method in any one of the second aspect or the possible designs of the second aspect, perform the communication method in any one of the fifth aspect or the possible designs of the fifth aspect, or perform the communication method in any one of the eighth aspect or the possible designs of the eighth aspect.

According to a fifteenth aspect, an embodiment of this application provides a computer program. When the computer program is run on a computer, the computer is enabled to perform the communication method in any one of the second aspect or the possible designs of the second aspect, perform the communication method in any one of the fifth aspect or the possible designs of the fifth aspect, or perform the communication method in any one of the eighth aspect or the possible designs of the eighth aspect.

For a technical effect brought by any design manner of the eleventh aspect to the fifteenth aspect, refer to the technical effect brought by any possible design of the second aspect, refer to the technical effect brought by any possible design of the fifth aspect, or refer to the technical effect brought by any possible design of the eighth aspect. Details are not described again.

DESCRIPTION OF EMBODIMENTS

With continuous development of communication technologies, a communication network becomes increasingly complex, the quantity of network elements becomes extremely large, and the types of the network elements are diverse. As a result, there are excessively complicated interactions between interface, protocol, and signaling. This engenders high costs, and increases the risk that the communication network becomes a target for attack.

A mobile communication system is network-centric, and users must adapt to a network. In other words, a user can only select a function provided by the network, in particular, a function that is provided by a centralized core network. As a result, the network cannot meet a personalized requirement of the user. However, the user increasingly pursues personalized services, and the internet of everything technology brings a sharp increase in terminal device types. Different terminal devices need to customize different functions as required. For example, a terminal device that does not move may not need a paging function. For another example, some internet-of-things terminal devices may not need a voice function.

In addition, a centralized core network element (for example, a mobile management function network element, a session management function network element, a user data management function network element, or a policy management function network element) entity usually can process a large quantity of user requirements and is deployed in a centralized manner. In this case, there may be risks of a single-point failure and a distributed denial of service (DDoS) attack. Consequently, enormous property and reputation damages to the user may result.

In addition, for privacy and ownership of personal data (for example, personal data that is currently distributed on an entity such as a home subscriber server (HSS)/unified data management (UDM) in an operator network and on a plurality of applications (APPs) and that is not owned and controlled by the user) of the user, there is a lack of reliable and secure mechanism. Therefore, it is difficult to meet an increasingly strict data privacy protection trend and requirement.

Figure 1:
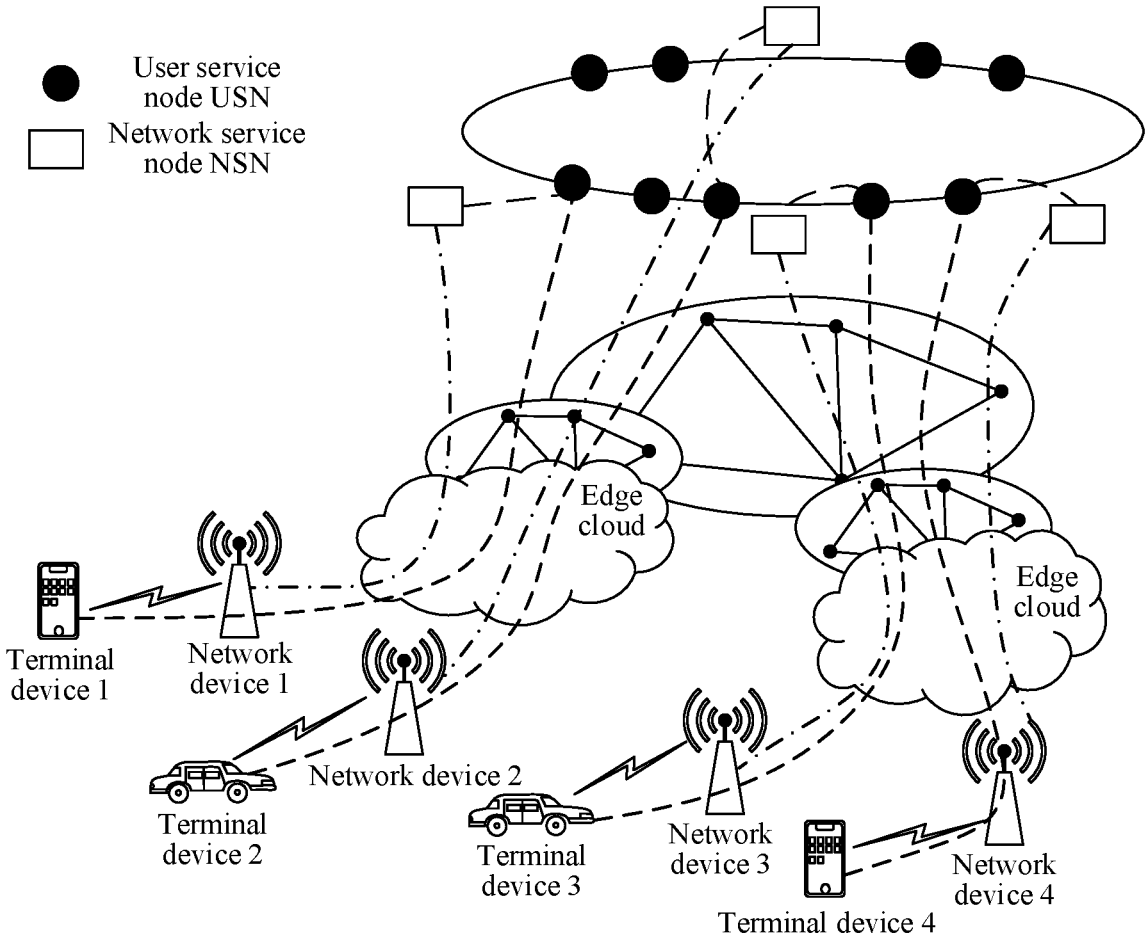
FIG. 1 is a schematic diagram of a UCN network architecture according to an embodiment of this application.

To solve the foregoing problem, a user-centric network (UCN) architecture is proposed. As shown in FIG. 1, a UCN network architecture may include a plurality of edge clouds, and one or more network service nodes (NSNs) may be deployed on each edge cloud. An NSN may configure, for a terminal device that accesses, via a network device, an edge cloud corresponding to the NSN, a user service node (USN) corresponding to the terminal device, where the USN may provide a service for the terminal device. In addition, based on a communication requirement of the terminal device, the USN may further be dynamically generated with a user and may migrate with the user, to implement a design of the user-centric network architecture. It should be noted that the edge cloud may also be described as a multi-access edge computing (MEC), and the UCN network architecture may also be described as a distributed/decentralized network architecture.

With continuous development of edge cloud technologies, edge clouds are to be widely deployed in a future communication network, so that traffic in the communication network is centered on a distributed data center (DC)/the edge cloud. In the UCN network architecture shown in FIG. 1, the quantity of terminal devices on the edge cloud indicates a corresponding quantity of USNs on the edge cloud. For USN nodes on a same edge cloud and USN nodes between different edge clouds, refer to a Chord routing mechanism used in an existing peer to peer (P2P) network. Network nodes (namely, the USNs) may be connected head to tail to form a logical ring, and each network node may quickly locate and communicate with a destination network node based on the logical ring.

The communication network may determine, based on a hash function (for example, a SHA-1 function), a space that includes a plurality of hashed values. Each hashed value in the space may be a node identifier, and the node identifiers may be sequentially arranged clockwise to form the logical ring. However, because the logical ring is obtained by sequencing the node identifiers based on the values of the node identifiers obtained after hash transformation, two nodes that are extremely adjacent on the logical ring may be far away from each other in an actual physical network. As a result, information about one node needs to be transmitted around a large circle to reach the other node, and a delay is large. Embodiments of this application provide a communication system, method, and apparatus. The communication system may include a first edge cloud and a second edge cloud. A first group of USNs are deployed on the first edge cloud, and a second group of USNs are deployed on the second edge cloud. The first group of USNs form a hash ring corresponding to the first edge cloud, and the second group of USNs form a hash ring corresponding to the second edge cloud. The USN is configured to provide a service for a terminal device corresponding to the USN.

The following describes implementations of some embodiments of this application in detail with reference to the accompanying drawings in this specification.

The communication system provided in embodiments of this application may be a communication system that uses a UCN network architecture. For example, the communication system may be a 6th generation (6G) communication system or a future communication system. This is not limited.

Figures 2, 3:
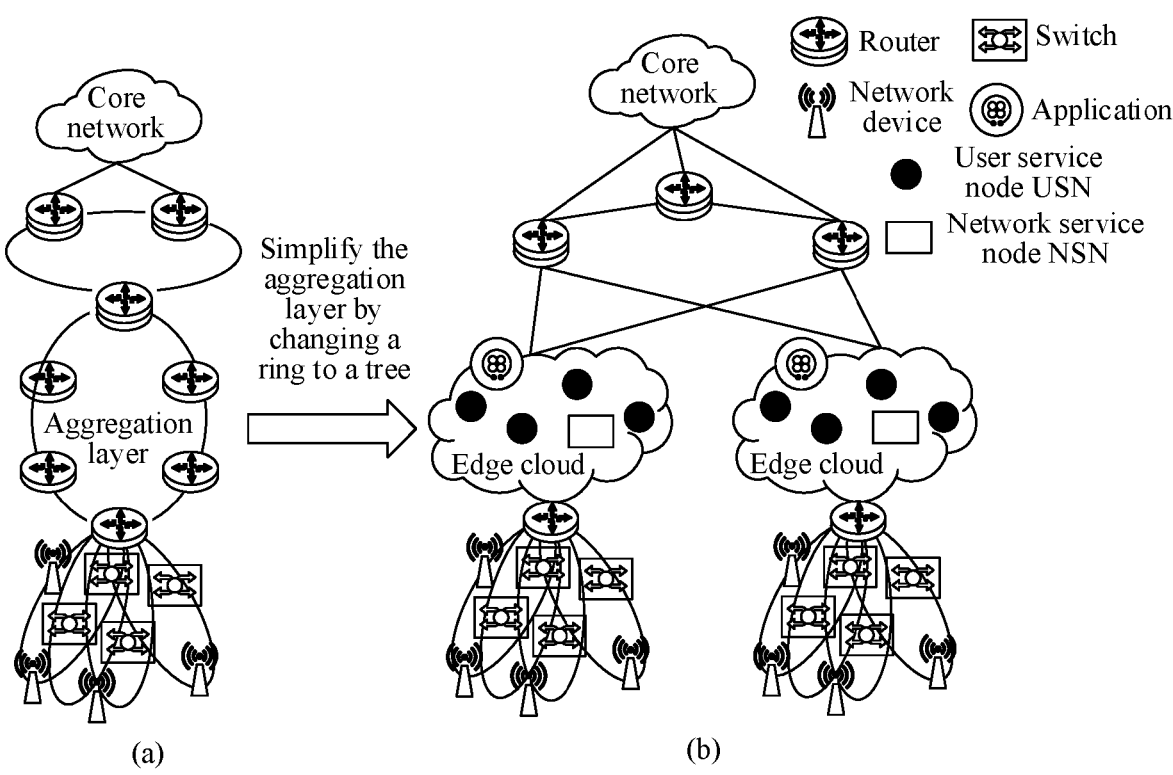
FIG. 2 is a schematic diagram of a traffic model according to an embodiment of this application.
FIG. 3 is a schematic diagram of a communication system according to an embodiment of this application.

In the communication system provided in embodiments of this application, edge clouds may be widely deployed based on a future traffic model shown in (b) in FIG. 2.

Specifically, as shown in FIG. 2, a conventional traffic model shown in (a) in FIG. 2 may be simplified into the future traffic model shown in (b) in FIG. 2 by changing a ring to a tree.

As shown in (a) in FIG. 2, a network device may send data and/or signaling to a router at an aggregation layer via a switch, the router at the aggregation layer sends the data and/or the signaling to a core network, and the core network processes the data and/or the signaling. The aggregation layer may be simplified in the manner of changing the ring to the tree, to obtain the future traffic model shown in (b) in FIG. 2.

As shown in (b) in FIG. 2, the future traffic model may present a distributed feature in which traffic is mainly terminated locally. The network device may send data and/or signaling to an edge cloud via the switch and the router, and the edge cloud processes the data and/or the signaling, to better support an application that has a high requirement on delay, data privacy, and the like. Alternatively, the edge cloud may send the data and/or signaling to the core network via the router, and the core network processes the data and/or the signaling. The router may be deployed on an edge cloud, may be deployed between the edge cloud and the network device, or may be deployed between an edge cloud and the core network. The core network may alternatively be deployed on a core cloud.

Compared with the conventional traffic model shown in (a) in FIG. 2, in a communication system that uses the future traffic model, edge clouds are widely deployed, and an edge cloud processes data and/or signaling of terminal devices, so that most querying processes in a network can be completed on the edge cloud. This enables a large increase of the quantity of access terminal devices and a geometric progression increase of traffic. The traffic may be centered on a distributed data center/edge cloud. Most traffic is forwarded and terminated at a network edge. This greatly shortens system querying time and reduces the quantity of messages to be sent. In addition, cross-domain traffic is also reduced, so that data exchange between the terminal device and a core network device is more distributed and dynamic, and traverses a short distance/a minimum quantity of hops. This reduces communication delay and improves communication performance of the communication system.

As shown in FIG. 3, the communication system may include one or more terminal devices, one or more network devices, one or more edge clouds, and a core cloud.

Several terminal devices in FIG. 3 may be located in a coverage area of a beam/cell of a network device, and the network device may provide a communication service for the terminal devices inside its coverage. For example, the network device may encode downlink data through channel encoding, and transmit the downlink data to one of the terminal devices through an air interface after performing constellation modulation on the downlink data. Alternatively, a terminal device may encode uplink data through channel encoding, and send the uplink data to the network device through an air interface after performing constellation modulation on the uplink data. A terminal device may also be referred to as user equipment (UE), a mobile station (MS), a mobile terminal (MT), or the like. For example, a terminal device may be a mobile phone (mobile phone), a smartwatch, a tablet computer, or a computer having a wireless transceiver function. Alternatively, a terminal device may be a virtual reality (VR) terminal, an augmented reality (AR) terminal, a wireless terminal in industrial control, a wireless terminal in self driving, a wireless terminal in telemedicine, a wireless terminal in a smart grid, a wireless terminal in a smart city (smart city), a wireless terminal in a smart home (smart home), a vehicle terminal, a vehicle having a vehicle-to-vehicle (V2V) communication capability, an intelligent connected vehicle, an unmanned aerial vehicle that has a UAV-to-UAV (U2U) communication capability, or the like. This is not limited.

Network devices in FIG. 3 may be any device that has a wireless transceiver function, and is mainly configured to: implement functions such as wireless physical control, resource scheduling, radio resource management, radio access control, and mobility management, and provide a reliable wireless transmission protocol, a reliable data encryption protocol, and the like. Specifically, a network device may be a device that supports wired access, or may be a device that supports wireless access. For example, the network device may be an access network (AN) device/a radio access network (RAN) device, and includes a plurality of AN/RAN nodes. The AN/RAN node may be an access point (AP), a base station (NB), an enhanced base station (eNB), a next-generation base station (NR NodeB, gNB), a transmission reception point (TRP), a transmission point (TP), another access node, or the like.

The edge clouds in FIG. 3 are deployed on a network edge node, and are closer to a user. For example, an edge cloud may be a cloud computing platform built on an edge infrastructure based on a core cloud computing capability and an edge cloud computing capability of a cloud computing technology. The edge cloud may be implemented based on widely covered small sites. Generally, the edge is a content delivery network (CDN), a point of presence (POP), or a mobile edge computing (MEC). Each node provides a public cloud service externally in a small cluster form. The edge clouds may be interconnected through a channel. The edge cloud and the core cloud in FIG. 3 may form a collaborative and complementary relationship. Because the edge cloud is closer to the user, the edge cloud can better support the application that has the high requirement on the delay, the data privacy, and the like, and is appropriate for distributed deployment of network functions. Embodiments of this application may be applicable to a communication scenario in which the edge clouds are widely deployed.

Figure 4:
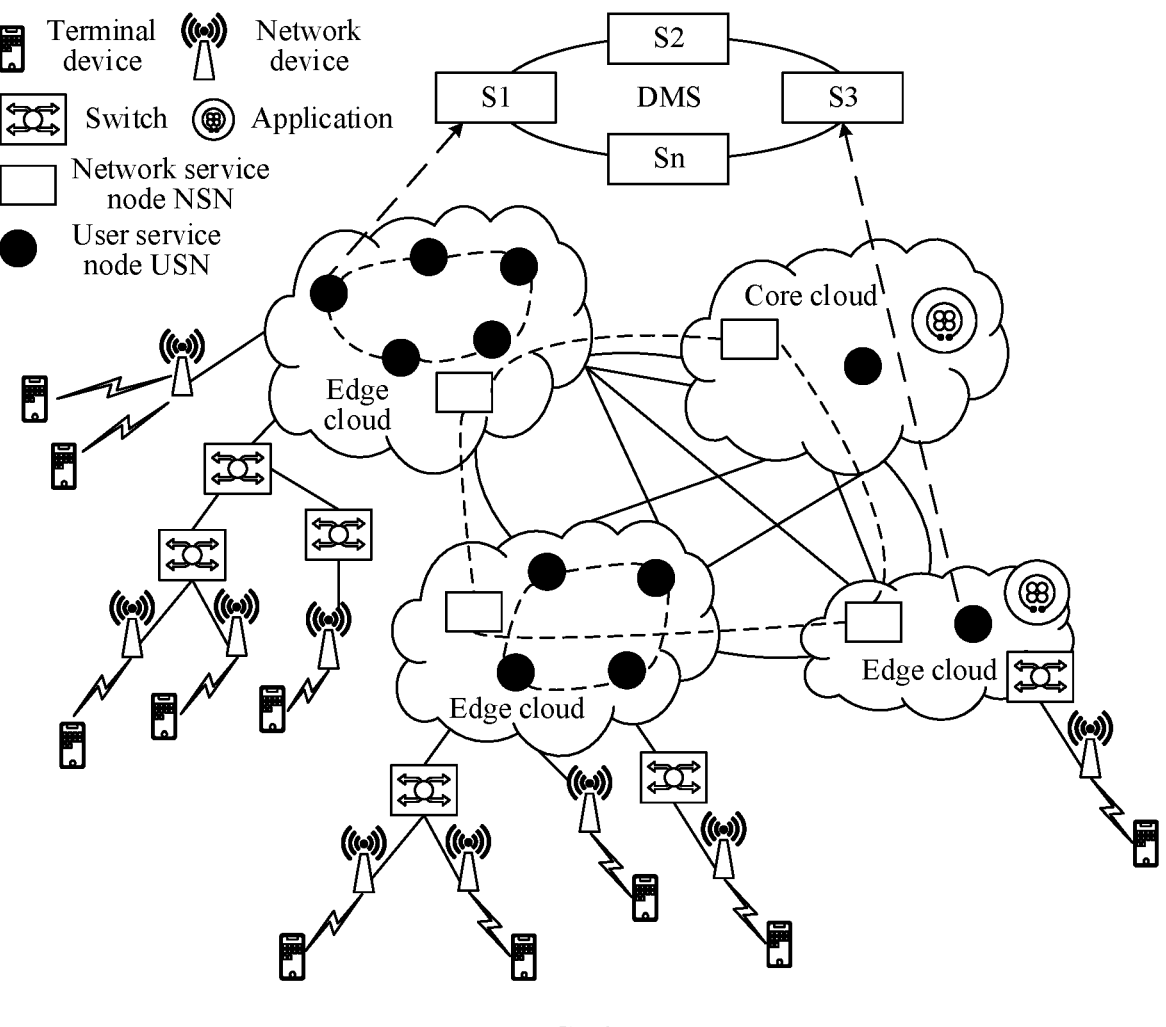
FIG. 4 is a schematic diagram of a communication system according to an embodiment of this application.

Specifically, as shown in FIG. 4, a group of USNs may be deployed on each edge cloud, and the group of USNs deployed on each edge cloud may form a hash ring corresponding to the edge cloud, that is, the group of USNs on each edge cloud form a ring independently.

Figure 5:
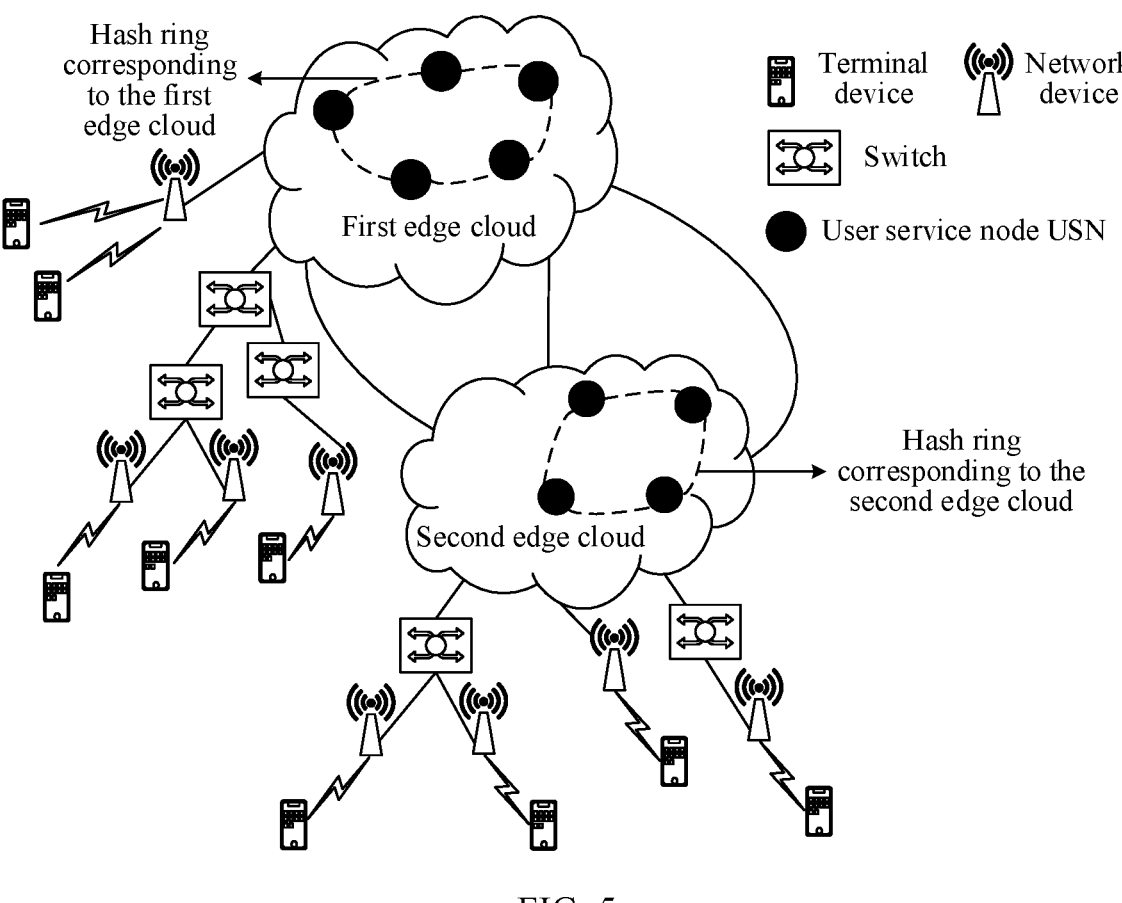
FIG. 5 is a schematic diagram of a communication system according to an embodiment of this application.

For example, as shown in FIG. 5, the edge clouds in the communication system include a first edge cloud and a second edge cloud. A first group of USNs may be deployed on the first edge cloud, a second group of USNs may be deployed on the second edge cloud, the first group of USNs may form a hash ring corresponding to the first edge cloud, and the second group of USNs may form a hash ring corresponding to the second edge cloud.

A USN may be associated with a terminal device. The USN belongs to the terminal device exclusively and provides a plurality of network services for the terminal device, for example, mobility management (MM), session management (SM), policy management (PM), and data forwarding. The USN and the terminal device associated with the USN may communicate with each other via a network device. Optionally, the network device and the USN communicate with each other via a switch.

The hash ring formed by the group of USNs deployed on each edge cloud may be a classic consistent hash algorithm, and implements minimum remapping.

Optionally, the group of USNs deployed on the edge cloud are connected head to tail based on the identification information of the USNs, to form the hash ring corresponding to the edge cloud.

Figure 6A:
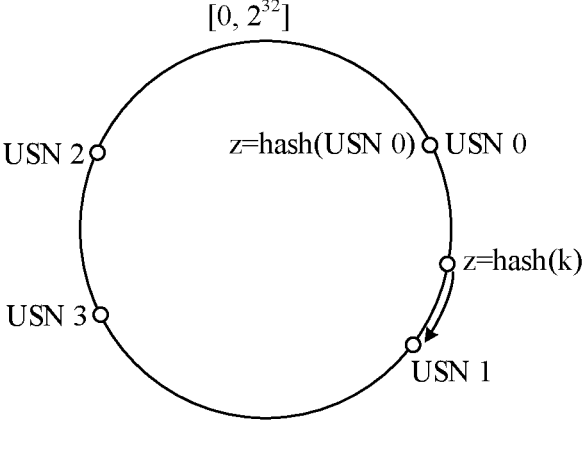
FIG. 6a is a schematic diagram of a hash ring according to an embodiment of this application.

For example, hash (k) is a hash function mapped to an interval $[0, 2^{32}]$. The interval may be connected head to tail to form a hash ring that increases clockwise, as shown in FIG. 6*a*. Identification information of all the USNs (for example, a USN 0, a USN 1, a USN 2, and a USN 3) on the edge cloud may be sequentially used as input of the hash function for hashing, and hash results are separately marked on the hash ring. For mapping about k, z=hash(k) is obtained and marked on the hash ring. If z happens to fall on a USN (for example, the USN 0, the USN 2, or the USN 3), identification information of the USN is returned; otherwise, a USN (for example, the USN 1) closest to z is queried for clockwise along the hash ring, and identification information of the USN is returned.

The identification information of a USN may include first identification information and second identification information, where the first identification information may indicate information about an edge cloud to which the USN belongs, and the second identification information may indicate identity information of the USN. The first identification information may also be described as a global part of the identification information of the USN, and the second identification information may also be described as a local part of the identification information of the USN.

Figure 6B:
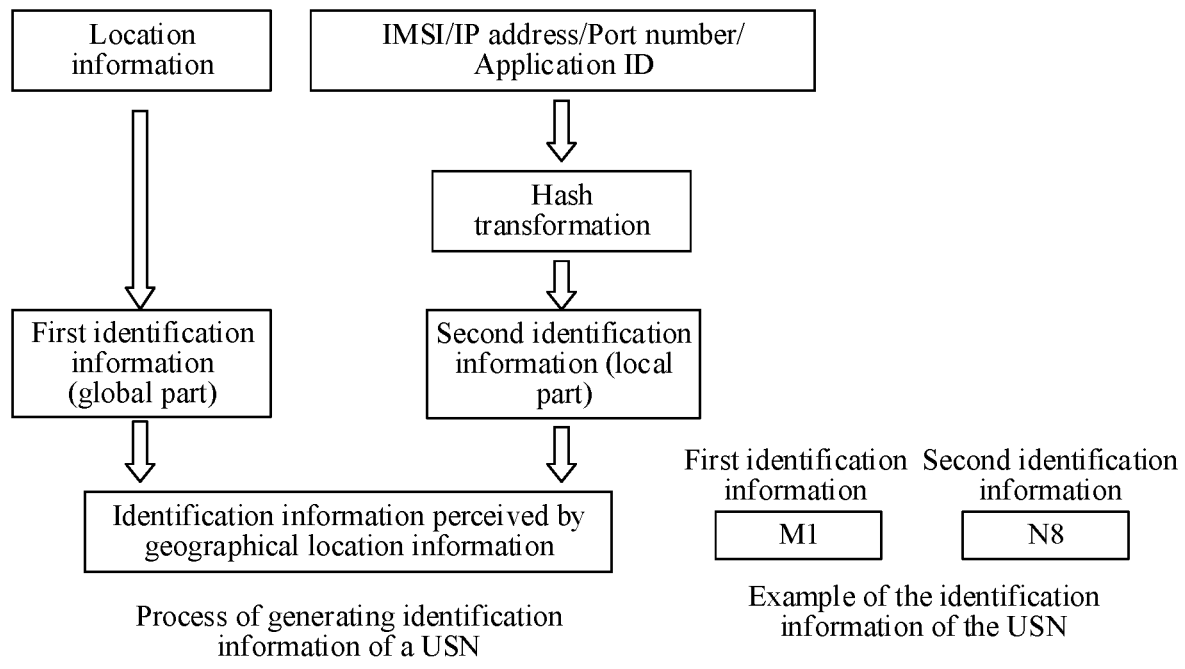
FIG. 6b is a schematic diagram of generating identification information of a USN according to an embodiment of this application.

For example, as shown in FIG. 6*b*, the first identification information may be location information of the edge cloud to which a USN belongs or may be described as location information of a MEC to which a USN belongs.

The location information of the edge cloud to which a USN belongs may include one or more of the following: mobile country code (MCC), mobile network code (MNC), an identifier of a region in which the MEC to which the USN belongs is located, an identifier of a MEC set to which the USN belongs, and a pointer of the MEC to which the USN belongs in the MEC set. Geographical location information of the terminal device corresponding to the USN may be obtained through parsing based on the location information.

The MCC may include 3-digit digital code that uniquely identifies a country to which a mobile user belongs. The MNC may include code of an operator network in the country, may include two to three digits, and identifies a mobile communication network to which the mobile user belongs. The MCC and the MNC may also be collectively referred to as a home location identifier.

Figure 7:
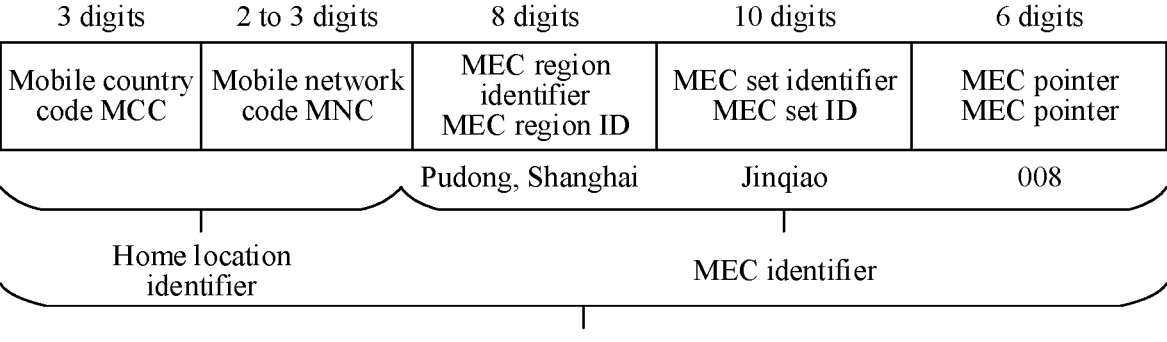
FIG. 7 is a schematic diagram of composition of a GUMEI according to an embodiment of this application.

Because the location information of the MEC may uniquely identify one MEC, as shown in FIG. 7, geographical location information of the MEC may also be referred to as a globally unique MEC identifier (GUMEI). The GUMEI may include the home location identifier and a MEC identifier (ID). The home location identifier may include the MCC and the MNC. The MEC identifier may include a MEC region (region) ID, a MEC set (set) ID, and a MEC pointer (pointer). The MEC region ID is an identifier of a geographical region in which the MEC is located. The geographical region may be, for example, an administrative unit in a district, for example, Pudong, Shanghai. The MEC set ID is an identifier of a set including MECs in a region at a lower level than the geographic region in which the MEC is located. The region at a lower level than the geographic region in which the MEC is located may be an administrative unit in a township, for example, Jinqiao, Pudong, Shanghai. The MEC pointer is a pointer of the MEC in the set, for example, 008.

The MEC region identifier may be 8-digit, the MEC set identifier may be 10-digit, and the MEC pointer may be 6-digit.

Figure 8:
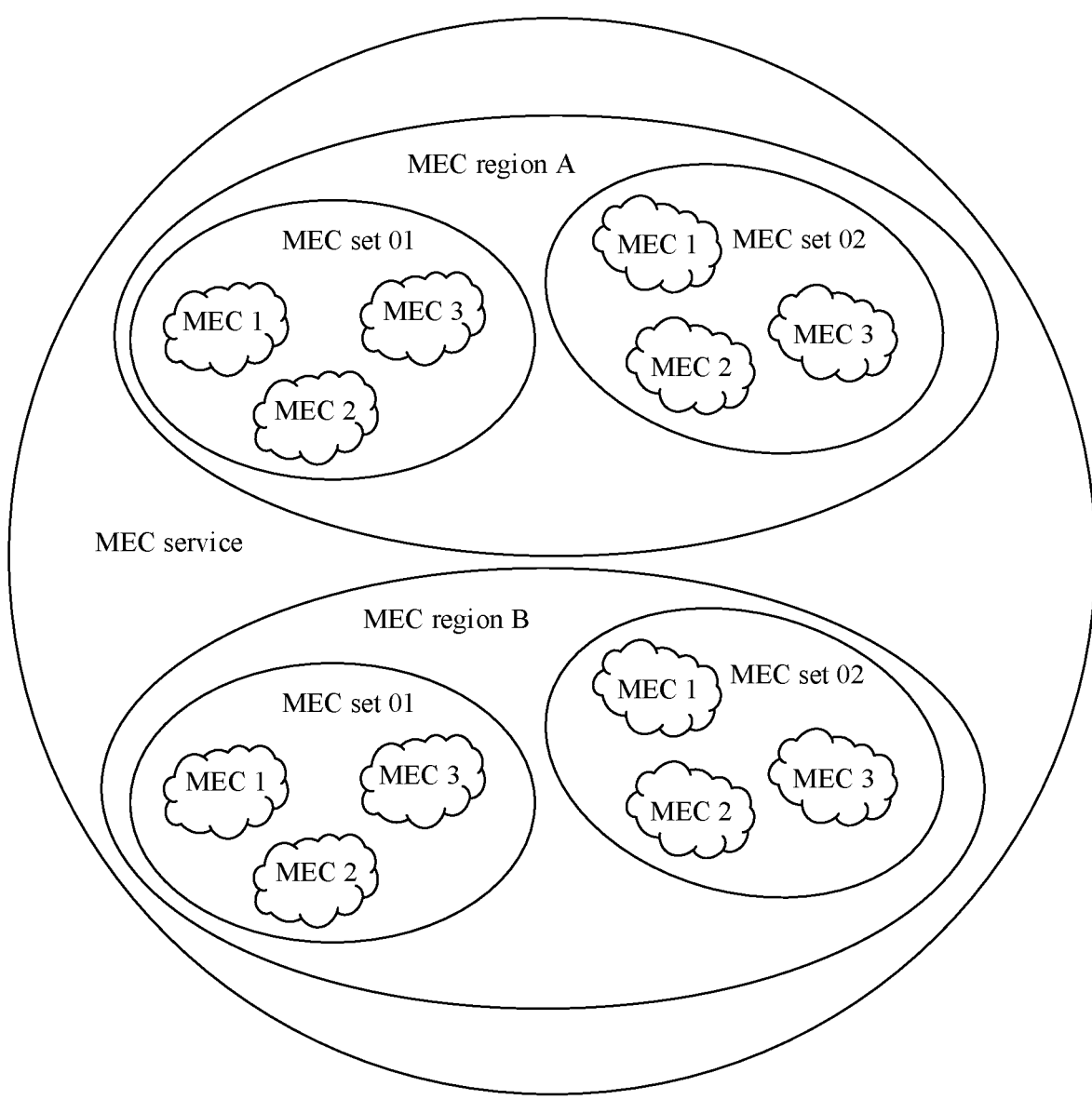
FIG. 8 is a schematic diagram of composition of a MEC domain according to an embodiment of this application.

FIG. 8 is a schematic structural diagram of a MEC region. A MEC service may include one or more MEC regions, the MEC region may include one or more MEC sets, and the MEC set may include one or more MECs. For example, as shown in FIG. 8, the MEC service may include a MEC region A and a MEC region B. The MEC region A may include a MEC set 01 and a MEC set 02. The MEC set 01 includes a MEC 1, a MEC 2, and a MEC 3. The MEC set 02 may include a MEC 1, a MEC 2, and a MEC 3. The MEC region B may include a MEC set 01 and a MEC set 02. The MEC set 01 includes a MEC 1, a MEC 2, and a MEC 3. The MEC set 02 may include a MEC 1, a MEC 2, and a MEC 3.

Because the first identification information in the identification information of a USN may be generated based on the location information of the edge cloud to which the USN belongs, the identification information of the USN may also be described as identification information perceived by the geographical location information.

Optionally, the first identification information in the identification information of USN nodes on a same edge cloud is the same, and the first identification information in the identification information of USN nodes on different edge clouds is different, so that whether two USNs belong to a same edge cloud is determined based on the first identification information in the identification information of the two USNs.

In addition, the first identification information in the identification information of the USN nodes on the same edge cloud is the same, and the USNs on the same edge cloud may be closer in identification space.

For example, as shown in FIG. 6*b*, hash transformation may be performed on the identity information of a USN to obtain the second identification information.

The identity information of a USN may be one or more of the following: an international mobile subscriber identity (IMSI), an internet protocol (IP) address, a port (port) number, or an application identifier (APP ID).

Optionally, the first identification information is located in a high byte of the identification information of the USN, and the second identification information is located in a low byte of the identification information of the USN.

For example, as shown in FIG. 6b, it may be determined, based on the edge cloud to which the USN belongs, that the first identification information is M1, and hash transformation is performed based on the identity information of the USN, to determine that the second identification information is N8. In this case, the identification information of the USN is M1N8.

Based on the foregoing descriptions of the identification information of a USN, the USNs located on a same edge cloud may be connected clockwise from head to tail based on the identification information of the USNs and the values of the identifiers, to form a hash ring corresponding to the edge cloud.

Optionally, a USN may store routing information of some USNs on the hash ring on which the USN is located, to reduce a case in which the USN frequently updates routing information stored in the USN due to a change of a network topology of another edge cloud, reduce routing overheads, and reduce load of the USN and a communication network.

The core cloud in FIG. 3 may be a data center (of an operator or an internet television (OTT)) that may be based on a cloud computing architecture. In an example, computing, storage, and network resources in the core cloud are loosely coupled, various internet technology (IT) devices and a new data center with high modularity, high automation level, and high degree of being eco-friendly are virtualized. A core network may be deployed on the core cloud, and may be used to transmit a call request or a data request from the edge cloud to different external networks. The core network may be used as an interface provided by a bearer network for the external network, and may provide functions such as user connection, user management, and bearer connection. The core cloud and the edge cloud may form the collaborative and complementary relationship, to better support an application corresponding to the terminal device. Optionally, the edge cloud communicates with the core cloud via a data center of the core cloud.

In the communication system provided in embodiments of this application, the USNs on a same edge cloud may form a hash ring, and different edge clouds may correspond to different hash rings. Because the USNs on the same hash ring are deployed on the same edge cloud, a physical distance between the USNs on the same hash ring is short. Compared with that USNs deployed on all edge clouds correspond to a same hash ring, that USNs deployed on different edge clouds correspond to different hash rings can alleviate the detour problem due to that a distance between the USNs on the same hash ring is short but an actual physical distance is long, to reduce a communication delay.

Optionally, as shown in FIG. 4, one or more NSNs are further deployed on each edge cloud, and NSNs on different edge clouds may be interconnected.

An NSN may perform full-service life-cycle management on a USN node on an edge cloud corresponding to the NSN, where the management includes generating, migrating, deleting, and replicating the USN, and allocating identification information of the USN. When a USN is added to or removed from a hash ring corresponding to the edge cloud, routing tables of USNs before and after the USN on the hash ring may be updated.

For example, the NSN may generate the USN by using a virtual machine. When a user is handed over across edge clouds (where to be specific, the user moves from a coverage area of an edge cloud to a coverage area of another edge cloud), USN migration may occur, to be specific, an NSN on the edge cloud that is handed over to may generate a new USN for the user. An NSN on the edge cloud that is handed over from may migrate user-related information from a USN on the edge cloud that is handed over from to a USN on the edge cloud that is handed over to. After the migration is completed, the NSN on the edge cloud that is handed over from may delete the USN that is handed over from.

Specifically, based on the foregoing descriptions of the identification information of the USN, an NSN may generate a USN for a terminal device that accesses an edge cloud corresponding to the NSN, allocate a node identifier to the USN, and perform full-service life-cycle management on the USN. When a terminal device accesses an edge cloud, a USN allocated by an NSN on the edge cloud to the terminal device is located on the edge cloud. This can reduce a detour problem caused by that a distance between USNs on a same hash ring is short but an actual physical distance is long, thereby reducing a communication delay.

Figure 9A:
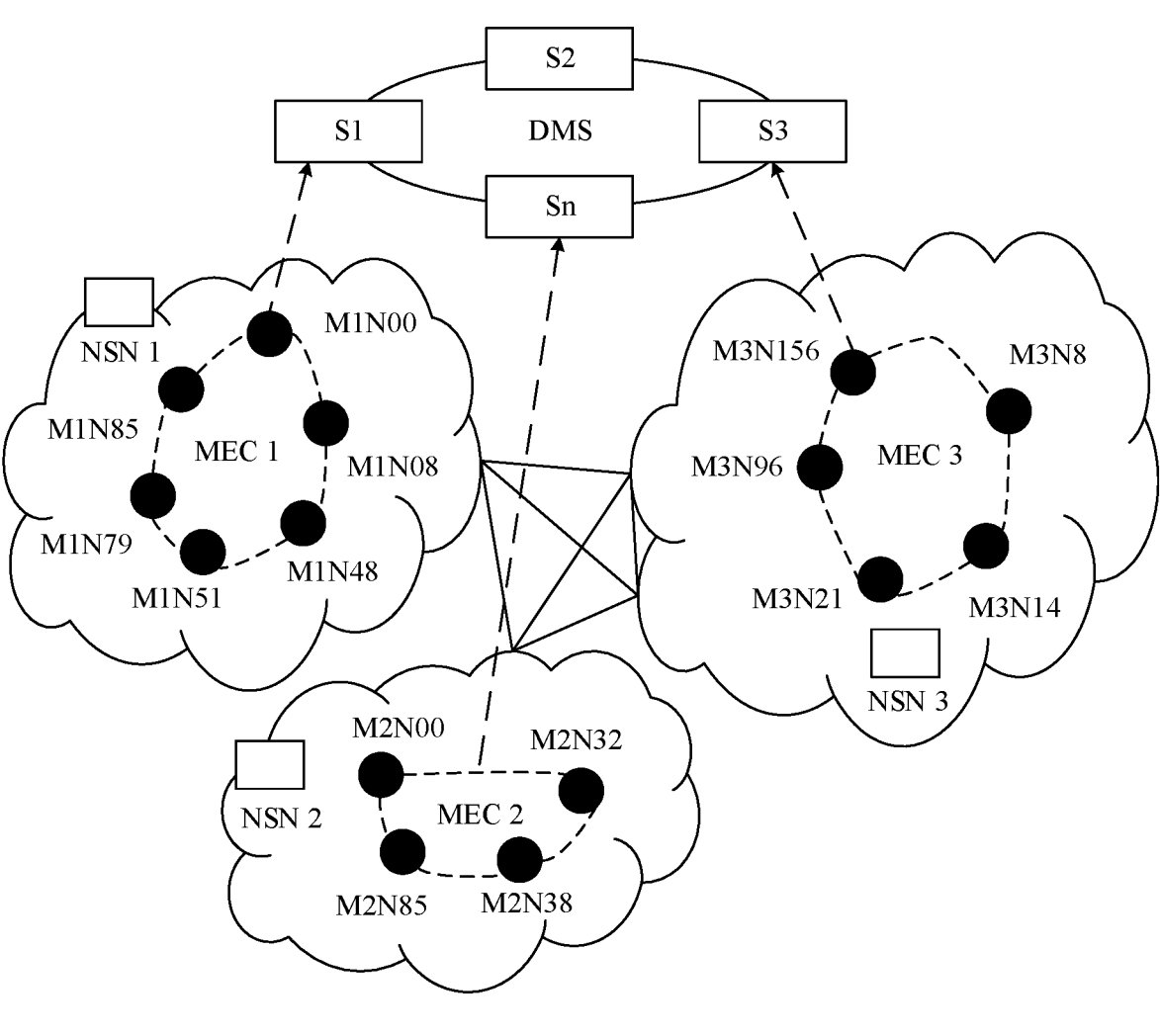
FIG. 9a is a schematic diagram of a communication system according to an embodiment of this application.

For example, as shown in FIG. 9a, the communication system includes a MEC 1, a MEC 2, and a MEC 3. The MEC 1 may include an NSN 1, and identification information allocated by the NSN 1 to a USN on the MEC 1 may be M1N00, M1N08, M1N48, M1N51, M1N79, and M1N85. The MEC 2 may include an NSN 2, and identification information allocated by the NSN 2 to a USN on the MEC 2 may be M2N00, M2N32, M2N38, and M2N85. The MEC 3 may include an NSN 3, and identification information allocated by the NSN 3 to a USN on the MEC 3 may be M3N8, M3N14, M3N21, M3N96, and M3N156.

On an edge cloud, an NSN is used to manage and control USNs on the edge cloud, in other words, a management and supervision mechanism is added to restrict user behavior and improve stability of the communication system. In addition, in embodiments of this application, a group of USNs deployed on a current edge cloud form a hash ring corresponding to the edge cloud. When an edge cloud is newly added, the group of USNs deployed on the newly added edge cloud may form a hash ring corresponding to the newly added edge cloud. Network extension becomes convenient.

Figures 9B, 10:
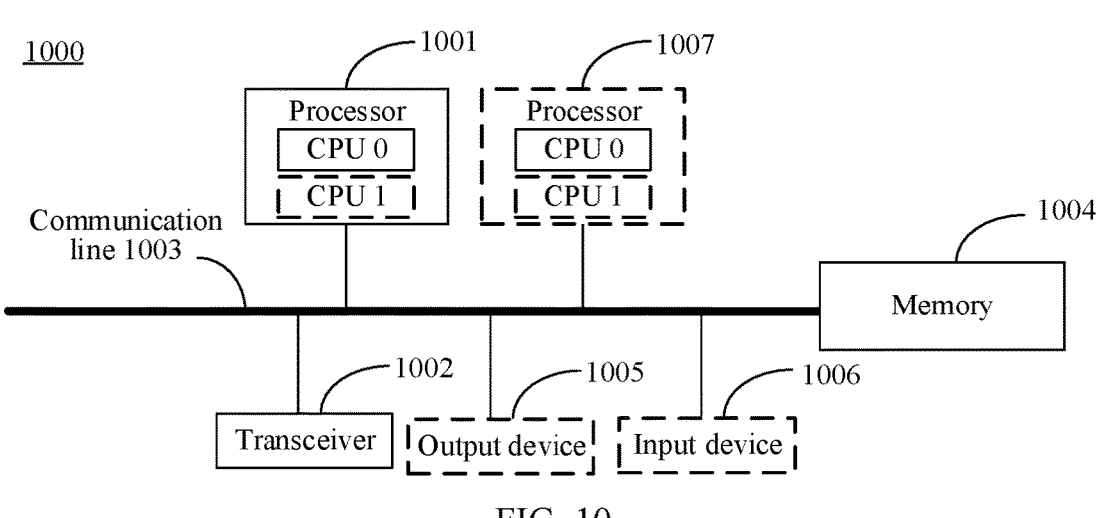
FIG. 9b is a schematic diagram of a communication system according to an embodiment of this application.
FIG. 10 is a diagram a composition structure of a communication apparatus according to an embodiment of this application.

Optionally, as shown in FIG. 4, FIG. 9a, and FIG. 9b, the communication system further includes a mapping system.

Optionally, the mapping system is a distributed mapping system (DMS).

The mapping system may include one or more distributed mapping nodes. When the mapping system includes a plurality of distributed mapping nodes, a plurality of distributed mapping nodes may form one or more hash rings corresponding to the mapping system. The distributed mapping node may also be described as a distributed hash table (DHT) node.

For example, as shown in FIG. 4 and FIG. 9a, the DMS may include distributed mapping nodes S1, S2, . . . , and Sn, and the n distributed mapping nodes may form a hash ring corresponding to the DMS. As shown in FIG. 9b, the DMS may include distributed mapping nodes S1, S2, . . . , Sm, S(m+1), S(m+2), S(m+3), . . . , and Sn, and then distributed mapping nodes may alternatively form a plurality of hash rings corresponding to the DMS.

The mapping system may be a system architecture corresponding to one hash ring, or may be a cascaded system architecture corresponding to the plurality of hash rings. When the mapping system uses the cascaded system architecture, if a change of a distributed mapping node causes a change of a network topology of the mapping system, routing information stored in another distributed mapping node on a hash ring on which the distributed mapping node that is changed is located may be modified, and routing information stored in a distributed mapping node on another hash ring does not need to be modified. This reduces routing overheads and storage load of the distributed mapping node.

Further, the one or more distributed mapping nodes in the DMS may store information about the USNs on each edge cloud in the communication system, and update the information about the USNs when the information about the USNs is changed.

For example, a terminal device corresponding to a first USN moves from a coverage area of the first edge cloud to a coverage area of the second edge cloud. An NSN on the second edge cloud may configure a USN on the second edge cloud for the terminal device. Assuming that the USN configured by the NSN on the second edge cloud for the terminal device is a third USN, the distributed mapping node in the DMS may delete prestored information about the first USN. The distributed mapping node of the DMS may alternatively newly include information about the third USN, where the information about the third USN includes identification information of the third USN and identification information of the terminal device. Alternatively, the distributed mapping node in the DMS may update the identification information of the first USN in the prestored information about the first USN to the identification information of the third USN, where the updated information about the first USN may be described as the information about the third USN.

The information about the USN may include the identification information of the USN and the identification information of the terminal device corresponding to the USN.

For example, the identification information of the terminal device may be an endpoint identifier (EID) of the terminal device.

The edge clouds in the communication system may be cascaded through the one or more hash rings corresponding to the DMS. When a USN on an edge cloud performs data transmission, the USN may quick querying for identification information of a destination USN on the edge cloud and between the edge clouds by using the mapping system, and send data to the destination USN.

When the DMS includes the plurality of distributed mapping nodes, the information about the USNs on each edge cloud may be stored in the plurality of distributed mapping nodes in a distributed storage manner.

For example, the communication system includes the first edge cloud, the second edge cloud, and a third edge cloud, and the mapping system includes a first distributed mapping node and a second distributed mapping node. Information about the USN deployed on the first edge cloud and the second edge cloud may be stored in the first distributed mapping node, and information about a USN deployed on the third edge cloud may be stored in the second distributed mapping node.

Further, each USN may store one or more of the following information: information about a USN that belongs to a same edge cloud as the USN, or information about a USN that does not belong to the same edge cloud as the USN.

For example, the communication system includes the first edge cloud and the second edge cloud. It is assumed that the first group of USNs corresponding to the first edge cloud include the first USN and a second USN, and the second group of USNs corresponding to the second edge cloud include the third USN and a fourth USN. The first USN may store one or more of the following information: information about the second USN, the information about the third USN, and information about the fourth USN. The second USN may store one or more of the following information: the information about the first USN, the information about the third USN, and the information about the fourth USN. The third USN may store one or more of the following information: the information about the first USN, the information about the second USN, and the information about the fourth USN. The fourth USN may store one or more of the following information: the information about the first USN, the information about the second USN, and the information about the third USN.

When a USN performs data transmission, the USN may determine, based on information stored in the USN, whether the information includes the identification information of the destination USN. If the information includes the identification information of the destination USN, data is sent to the destination USN based on the identification information of the destination USN, so that the destination USN is quickly queried for and a frequency of querying the DMS is reduced. If the information does not include the identification information of the destination USN, the identification information of the destination USN may be queried for by using the DMS, to send data to the destination USN.

Optionally, when the USN is configured to store information about another USN, the USN may store information about some USNs based on whether communication is performed, a communication frequency degree, and the like.

For example, the USN may store information about another USN that communicates with the USN.

Based on the foregoing descriptions of the communication system, during specific implementation, for example, the USNs, the NSNs, the distributed mapping nodes, the terminal devices, and the network devices may all use a composition structure shown in FIG. 10, or include a component shown in FIG. 10. FIG. 10 is a schematic diagram of composition of a communication apparatus according to an embodiment of this application. The communication apparatus 1000 may be a USN, or a chip or a system-on-a-chip in the USN. The communication apparatus 1000 may alternatively be an NSN, or a chip or a system-on-a-chip in the NSN. The communication apparatus 1000 may alternatively be a distributed mapping node, or a chip or a system-on-a-chip in the distributed mapping node. The communication apparatus 1000 may alternatively be a terminal device, or a chip or a system-on-a-chip in the terminal device. The communication apparatus 1000 may alternatively be a network device, or a chip or a system-on-a-chip in the network device. As shown in FIG. 10, the communication apparatus 1000 includes a processor 1001, a transceiver 1002, and a communication line 1003.

Further, the communication apparatus 1000 may further include a memory 1004. The processor 1001, the memory 1004, and the transceiver 1002 may be connected through the communication line 1003.

The processor 1001 is a central processing unit (CPU), a general-purpose processor, a network processor (NP), a digital signal processor (DSP), a microprocessor, a microcontroller, a programmable logic device (PLD), or any combination thereof. The processor 1001 may alternatively be another apparatus that has a processing function, for example, a circuit, a component, or a software module. This is not limited.

The transceiver 1002 is configured to communicate with another device or another communication network. The other communication network may be an Ethernet, a radio access network (RAN), a wireless local area network (WLAN), or the like. The transceiver 1002 may be a module, a circuit, a transceiver, or any apparatus that can implement communication.

The communication line 1003 is configured to transmit information between components included in the communication apparatus 1000.

The memory 1004 is configured to store instructions. The instructions may be a computer program.

The memory 1004 may be a read-only memory (ROM) or another type of static storage device that may store static information and/or instructions, may be a random access memory (RAM) or another type of dynamic storage device that may store information and/or instructions, or may be an electrically erasable programmable read-only memory (EE-PROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 1004 may be independent of the processor 1001, or may be integrated together with the processor 1001. The memory 1004 may be configured to store the instructions, program code, some data, or the like. The memory 1004 may be located inside the communication apparatus 1000, or may be located outside the communication apparatus 1000. This is not limited. The processor 1001 is configured to execute the instructions stored in the memory 1004, to implement the communication method provided in the following embodiments of this application.

In an example, the processor 1001 may include one or more CPUs, such as a CPU 0 and a CPU 1 in FIG. 10.

In an optional implementation, the communication apparatus 1000 includes a plurality of processors. For example, in addition to the processor 1001 in FIG. 10, the communication apparatus 1000 may further include a processor 1007.

In an optional implementation, the communication apparatus 1000 further includes an output device 1005 and an input device 1006. For example, the input device 1006 is a device such as a keyboard, a mouse, a microphone, or a joystick, and the output device 1005 is a device such as a display screen or a speaker.

It should be noted that the communication apparatus 1000 may be a desktop computer, a portable computer, a network server, a mobile phone, a tablet computer, a wireless terminal, an embedded device, a chip system, or a device that has a structure similar to the structure in FIG. 10. In addition, the composition structure shown in FIG. 10 does not constitute a limitation on the communication apparatus. In addition to the components shown in FIG. 10, the communication apparatus may include more or fewer components than those shown in the figure, some components may be combined, or different component arrangements may be used.

In this embodiment of this application, the chip system may include a chip, or may include a chip and another discrete component.

In addition, for actions, terms, and the like in embodiments of this application, refer to each other. This is not limited. In embodiments of this application, a name of a message interacted between devices, a name of a parameter in the message, or the like is merely an example. Another name may alternatively be used during specific implementation. This is not limited.

With reference to the communication system shown in FIG. 2, FIG. 3, FIG. 4, FIG. 5, FIG. 9*a*, and FIG. 9*b*, and with reference to FIG. 11, an example in which the communication system includes a first edge cloud and a second edge cloud, the first edge cloud includes a first USN and a second USN, and the second edge cloud includes a third USN and a fourth USN is used below, to describe a communication method provided in embodiments of this application. A first terminal device may be a terminal device associated with the first USN. Both the USN and the terminal device described in the following embodiments may have the components shown in FIG. 10.

Figure 11:
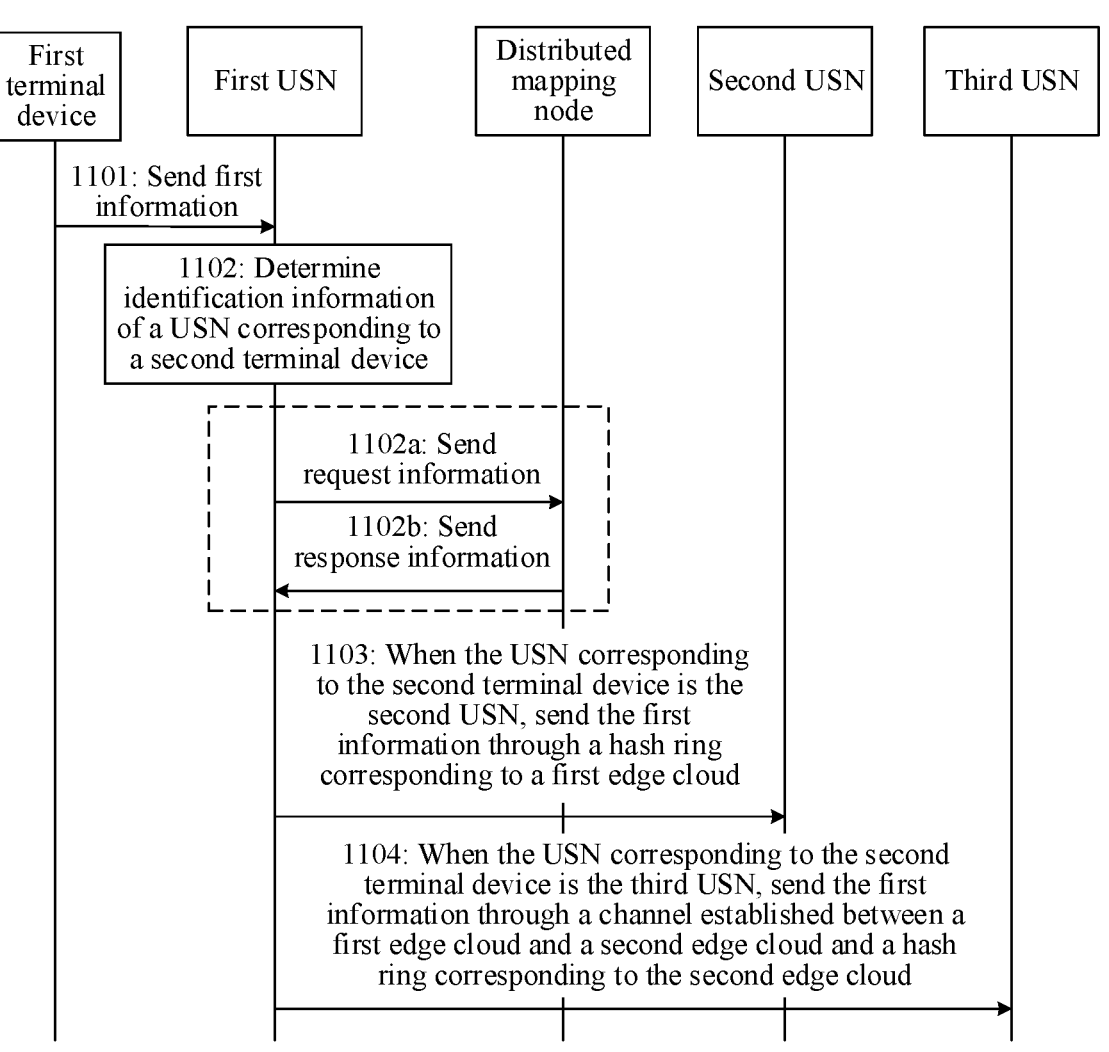
FIG. 11 is a flowchart of a communication method according to an embodiment of this application.

FIG. 11 is a flowchart of a communication method according to an embodiment of this application. As shown in FIG. 11, an example in which a first terminal device sends first information to a second terminal device is used to describe the communication method provided in this embodiment of this application. The method may include the following steps.

Step 1101: The first terminal device sends the first information to a first USN.

The first information may include identification information of the second terminal device.

For example, the identification information of the second terminal device may be an EID of the second terminal device. Specifically, the first terminal device may send the first information to the first USN via a network device.

Step 1102: The first USN determines identification information of a USN corresponding to the second terminal device. When the USN corresponding to the second terminal device is a second USN, the following step 1103 is performed. When the USN corresponding to the second terminal device is a third USN, the following step 1104 is performed.

The second USN may be any USN located on a same edge cloud as the first USN. The third USN may be any USN located on an edge cloud different from the edge cloud on which the first USN is located. For example, the third USN may be any USN on a second edge cloud.

For example, the first USN may determine, based on prestored information about a USN, the identification information of the USN corresponding to the second terminal device.

For another example, as shown in FIG. 11, the first USN may determine, by using the following step 1102*a* and step 1102*b*, the identification information of the USN corresponding to the second terminal device.

Step 1102*a*: The first USN sends request information to a distributed mapping node.

The request information may include the identification information of the second terminal device, and the request information requests the identification information of the USN corresponding to the second terminal device.

Step 1102*b*: The distributed mapping node sends a response message to the first USN. Correspondingly, the first USN receives the response message from the distributed mapping node.

The response message may include the identification information of the USN corresponding to the second terminal device, and the first USN may determine, based on the response message, the identification information of the USN corresponding to the second terminal device.

Based on the foregoing two examples, the first USN may first determine, based on the prestored information about the USN, whether the prestored information about the USN includes the identification information of the USN corresponding to the second terminal device. If the prestored information about the USN includes the identification information of the USN corresponding to the second terminal device, the identification information of the USN corresponding to the second terminal device is determined, so that the identification information of the USN corresponding to the second terminal device is quickly queried for in a local querying manner. This reduces a querying delay. If the prestored information about the USN does not include the identification information of the USN corresponding to the second terminal device, the first USN may determine, by using a mapping system, the identification information of the USN corresponding to the second terminal device.

It should be noted that the distributed mapping node may be any distributed mapping node in the mapping system. If a distributed mapping node communicatively connected to the first USN includes the identification information of the USN corresponding to the second terminal device, the distributed mapping node sends, to the first USN, the identification information of the USN corresponding to the second terminal device. If the distributed mapping node does not include the identification information of the USN corresponding to the second terminal device, the distributed mapping node may obtain, through a hash ring corresponding to the mapping system from a distributed mapping node that stores the identification information of the USN corresponding to the second terminal device, the identification information of the USN corresponding to the second terminal device, and send the identification information to the first USN.

After the first USN determines the identification information of the USN corresponding to the second terminal device, based on the foregoing descriptions of the identification information of the USN, the first USN may determine, based on first identification information in the identification information of the USN corresponding to the second terminal device, whether the first USN and the USN corresponding to the second terminal device belong to a same edge cloud. If the first USN and the USN corresponding to the second terminal device belong to the same edge cloud, an intra-domain routing manner based on a hash ring shown in the following step 1103 is performed. Otherwise, an inter-domain routing manner based on a channel between edge clouds shown in the following step 1104 is performed. In other words, when the USN corresponding to the second terminal device is the second USN, the following step 1103 is performed. When the USN corresponding to the second terminal device is the third USN, the following step 1104 is performed.

Step 1103: The first USN sends the first information to the second USN through a hash ring corresponding to a first edge cloud.

The first USN may query, based on second identification information in identification information of the second USN, for the second USN on the hash ring corresponding to the first edge cloud, and send the first information to the second USN.

Figure 12:
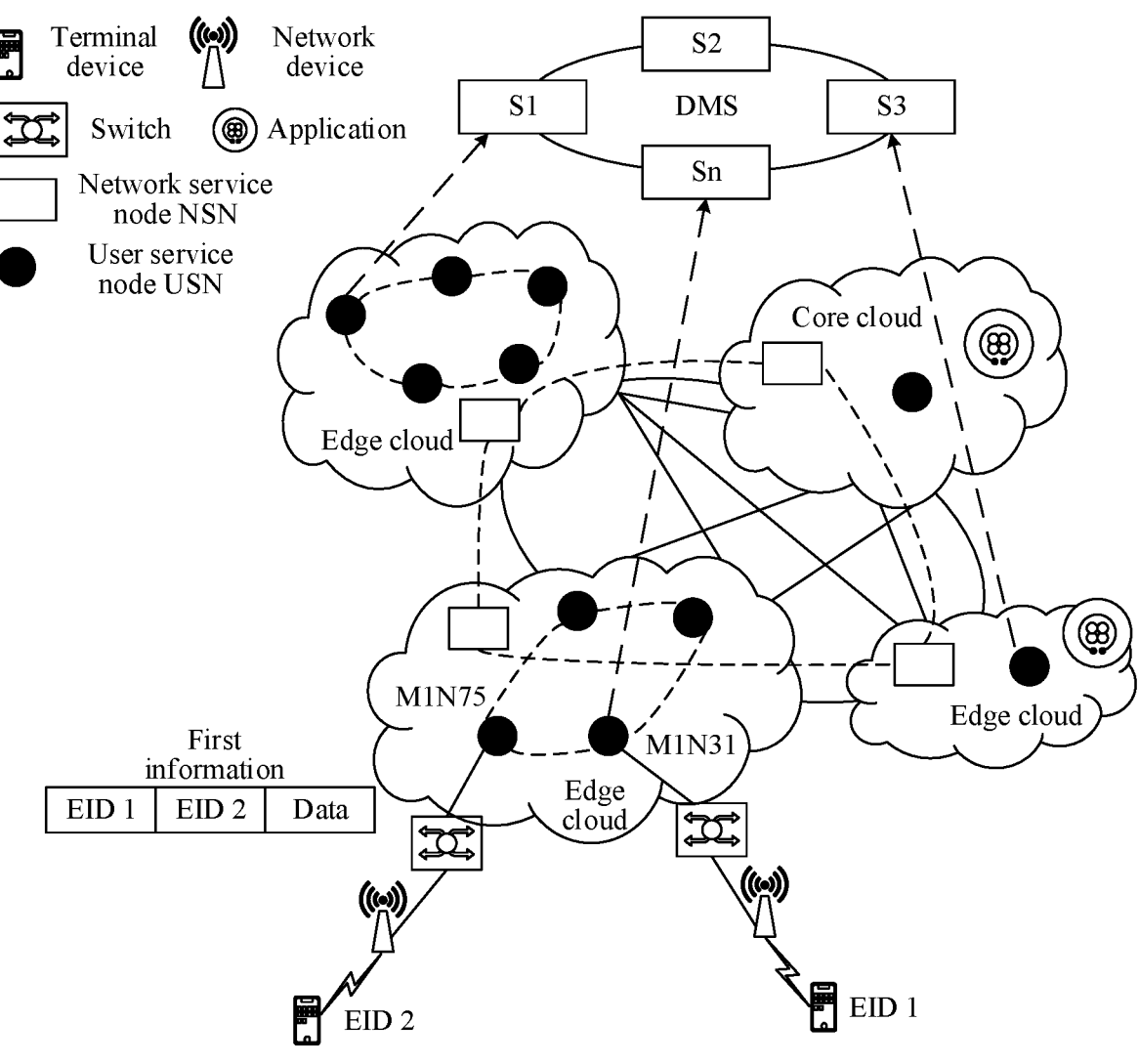
FIG. 12 is a schematic diagram of intra-domain routing according to an embodiment of this application.

For example, as shown in FIG. 12, identification information of the first terminal device is EID 1, the identification information of the second terminal device is EID 2, identification information of the first USN is M1N31, and the identification information of the second USN is M1N75. The first USN may receive the first information sent by the first terminal device. The first information may include the EID 1, the EID 2, and data. The first USN may determine, based on the EID 2 in the first information, whether the locally stored information about the USN includes identification information of a USN corresponding to the EID 2. If the locally stored information about the USN includes the identification information of the USN corresponding to the EID 2, the identification information of the USN corresponding to the EID 2 is determined. Otherwise, the first USN may query, by using the mapping system DMS, for the identification information of the USN corresponding to the EID 2. Assuming that the first USN determines that the USN corresponding to the EID 2 is the second USN whose identification information is M1N75, the first USN may determine, based on M1 in the identification information of the second USN, that the first USN and the second USN are located on a same edge cloud. The first USN may query, based on N75 in the identification information of the second USN, for the second USN on a hash ring on which the first USN is located, and send the first information to the second USN. After receiving the first information, the second USN sends the first information to the second terminal device based on the EID 2 in the first information.

Step 1104: The first USN sends the first information to the third USN through a channel between the first edge cloud and the second edge cloud and a hash ring corresponding to the second edge cloud.

For example, the first USN may send the first information to a USN on the second edge cloud through the channel between the first edge cloud and the second edge cloud. The USN may send the first information to the third USN through the hash ring corresponding to the second edge cloud.

The first USN may send the first information to any USN or a specified USN on the second edge cloud, and the USN or the specified USN may send the first information to the third USN through the hash ring corresponding to the second edge cloud.

Figure 13:
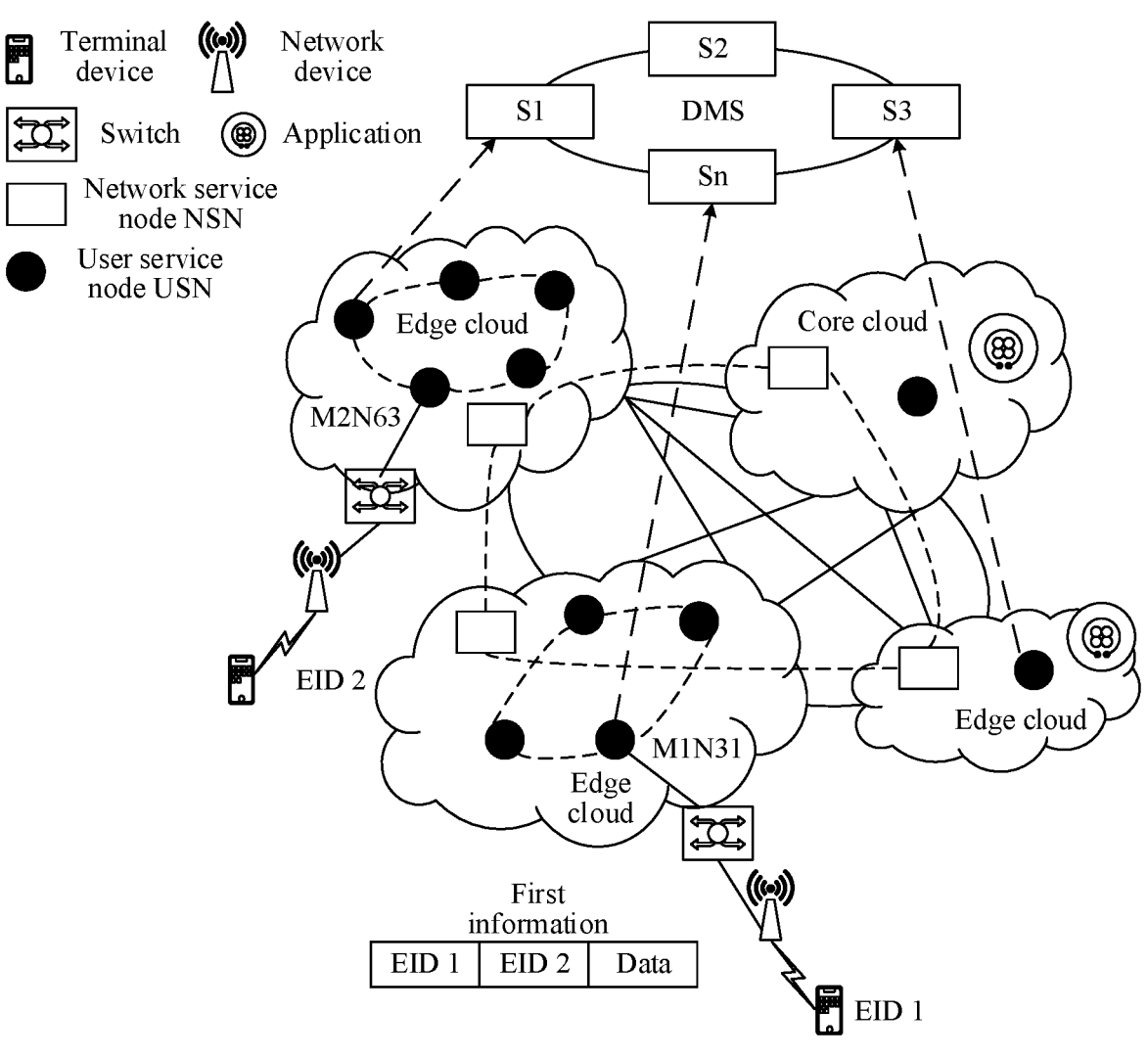
FIG. 13 is a schematic diagram of inter-domain routing according to an embodiment of this application.

For example, as shown in FIG. 13, the identification information of the first terminal device is the EID 1, the identification information of the second terminal device is the EID 2, the identification information of the first USN is M1N31, and the identification information of the third USN is M2N63. The first USN may receive the first information sent by the first terminal device. The first information may include the EID 1, the EID 2, and the data. The first USN may determine, based on the EID 2 in the first information, whether the locally stored information about the USN includes the identification information of the USN corresponding to the EID 2. If the locally stored information about the USN includes the identification information of the USN corresponding to the EID 2, the identification information of the USN corresponding to the EID 2 is determined. Otherwise, the first USN may query, by using the mapping system DMS, for the identification information of the USN corresponding to the EID 2. Assuming that the first USN determines that the USN corresponding to the EID 2 is the third USN whose identification information is M2N63, the first USN may determine, based on M2 in the identification information of the third USN, that the first USN and the third USN are located on different edge clouds. The first USN may send the first information to the USN on the second edge cloud through the channel between the first edge cloud and the second edge cloud. After receiving the first information, the USN on the second edge cloud may determine, based on the EID 2 in the first information, that the USN corresponding to the second terminal device is the third USN whose identification information is M2N63, and then query, based on N63 in the identification information of the third USN, for the third USN on the hash ring on which the USN is located, and send the first information to the third USN. After receiving the first information, the third USN sends the first information to the second terminal device based on the EID 2 in the first information.

Based on the foregoing method, the USNs on a same edge cloud may form a hash ring, and different edge clouds may correspond to different hash rings. The first USN may determine, based on the identification information of the second terminal device, the USN corresponding to the second terminal device. When the USN corresponding to the second terminal device is the second USN that belongs to the same edge cloud as the first USN, the first USN may send the first information to the second USN in the intra-domain routing manner that is based on the hash ring. When the USN corresponding to the second terminal device is the third USN that belongs to an edge cloud different from the edge cloud to which the first USN belongs, the first USN may send the first information to the third USN in the inter-domain routing manner that is based on the channel between the edge clouds. Because the USNs on a same hash ring are deployed on a same edge cloud, the physical distances between the USNs on the same hash ring are short. Compared with that USNs deployed on all edge clouds correspond to a same hash ring, that USNs deployed on different edge clouds correspond to different hash rings can alleviate the detour problem due to that a distance between the USNs on the same hash ring is short but an actual physical distance is long, to reduce a communication delay.

Further, when a terminal device moves from the coverage area of an edge cloud to the coverage area of another edge cloud, a USN corresponding to the terminal device is handed over, and information about the USN stored in the mapping system also needs to be updated.

Figure 14:
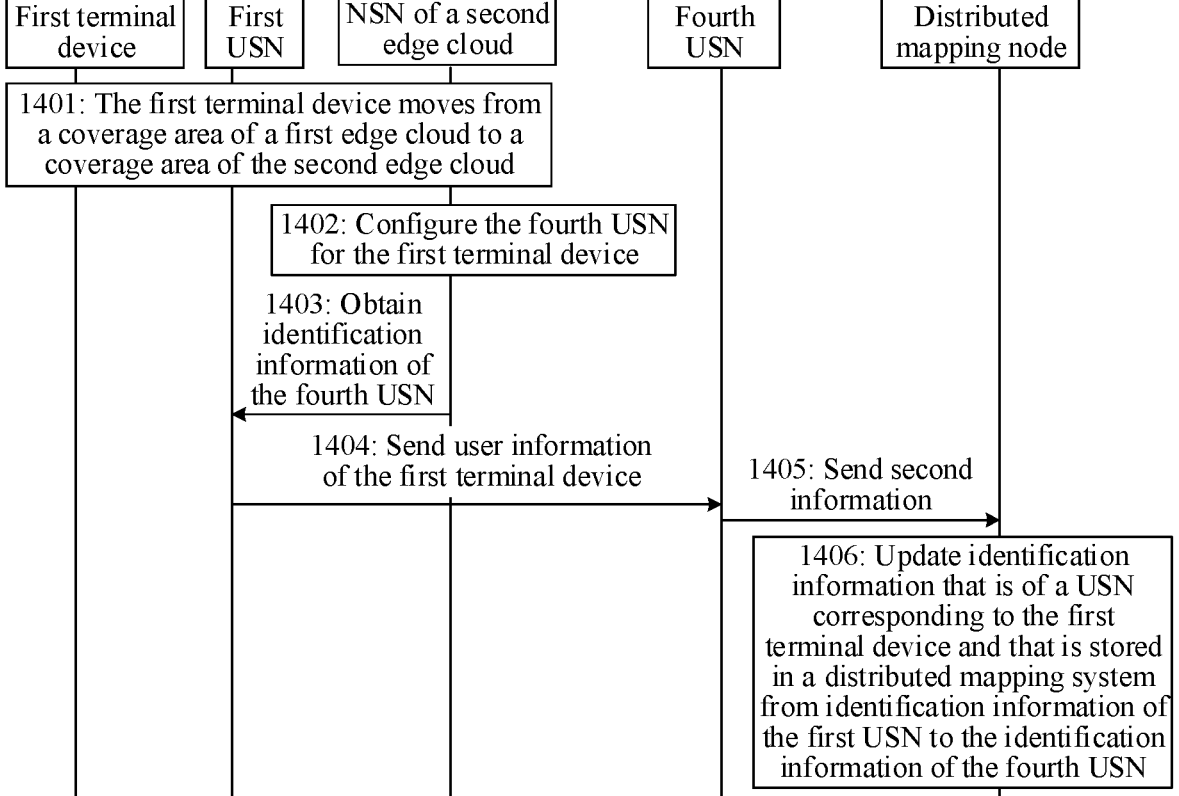
FIG. 14 is a flowchart of a method for performing USN handover by a terminal device according to an embodiment of this application.

As shown in FIG. 14, that a first terminal device moves from the coverage area of a first edge cloud to the coverage area of a second edge cloud is used as an example to describe USN handover performed by a terminal device.

FIG. 14 shows a method for performing a USN handover by a terminal device according to an embodiment of this application. As shown in FIG. 14, the method may include the following steps.

Step 1401: A first terminal device moves from a coverage area of a first edge cloud to a coverage area of a second edge cloud.

The first terminal device may correspond to a first USN on the first edge cloud, in other words, a USN from which the first terminal device is handed over is the first USN.

Step 1402: An NSN on the second edge cloud configures a fourth USN for the first terminal device.

The fourth USN may be a corresponding USN to which the first terminal device is handed over.

Specifically, the NSN on the second edge cloud may determine first identification information of the fourth USN based on the second edge cloud, and perform hash transformation based on identity information of the fourth USN, to obtain second identification information of the fourth USN. Identification information of the fourth USN is obtained based on the first identification information and the second identification information, the fourth USN is added, based on the identification information of the fourth USN, to a hash ring corresponding to the second edge cloud, and routing information of another USN on the second edge cloud is updated.

Step 1403: The first USN obtains the identification information of the fourth USN.

The NSN on the second edge cloud may send the identification information of the fourth USN to the first USN via an NSN on the first edge cloud.

Step 1404: The first USN sends user information of the first terminal device to the fourth USN.

Specifically, similar to the foregoing descriptions in which the first USN sends the first information to the third USN, the first USN may send the user information of the first terminal device to the fourth USN through a channel between the first edge cloud and the second edge cloud and the hash ring corresponding to the second edge cloud, and the fourth USN may better provide a service for the first terminal device based on the user information of the first terminal device.

In addition, after the first USN sends the user information of the first terminal device to the fourth USN, the NSN on the first edge cloud may delete the first USN from a hash ring corresponding to the first edge cloud, and update routing information of another USN.

Step 1405: The fourth USN sends second information to a distributed mapping node.

The second information may include the identification information of the fourth USN and identification information of the first terminal device.

Step 1406: The distributed mapping node updates, to the identification information of the fourth USN, the identification information that is of a USN corresponding to the first terminal device and that is stored in a mapping system.

If a distributed mapping node communicatively connected to the fourth USN stores the identification information of the USN corresponding to the first terminal device, the distributed mapping node updates the identification information of the USN corresponding to the first terminal device from identification information of the first USN to the identification information of the fourth USN. If the distributed mapping node does not store the identification information of the USN corresponding to the first terminal device, the distributed mapping node may send, through a hash ring corresponding to the mapping system, the second information to a distributed mapping node that stores the identification information of the USN corresponding to the first terminal device. The distributed mapping node may update the identification information of the USN corresponding to the first terminal device from the identification information of the first USN to the identification information of the fourth USN.

Figures 15, 16:
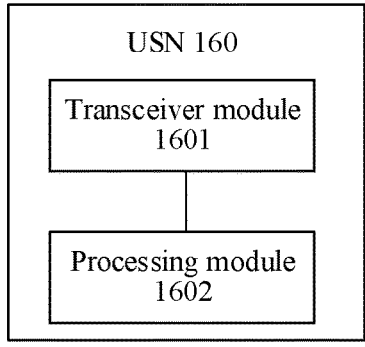
FIG. 15 is a schematic diagram of performing USN handover by a terminal device according to an embodiment of this application.
FIG. 16 is a schematic diagram of composition of a USN according to an embodiment of this application.

For example, as shown in FIG. 15, the identification information of the first terminal device is EID 1, the identification information of the first USN is M1N31, and the identification information of the fourth USN is M2N80. The second information may include the EID 1 and M2N80. After receiving the second information, the distributed mapping node may update, from M1N31 to M2N80, identification information that is of a USN corresponding to the EID 1 and that is stored in the mapping system.

Based on the method shown in FIG. 14, when a terminal device moves from a coverage area of an edge cloud to a coverage area of another edge cloud, an NSN on the other edge cloud may configure an associated USN for the terminal device. A USN from which the terminal device is handed over may send user information of the terminal device to a USN to which the terminal device is handed over. The USN to which the terminal device is handed over may better provide a service for the terminal device based on the user information of the terminal device. In addition, the USN to which the terminal device is handed over may send information about itself to the distributed mapping node, and the distributed mapping node may update identification information of the USN corresponding to the terminal device in the mapping system.

The foregoing mainly describes solutions provided in embodiments of this application from a perspective of interaction between devices. It may be understood that, to implement the foregoing functions, each device includes corresponding hardware structures and/or software modules for performing the functions. A person skilled in the art should understand that, in this application, the algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into function modules based on the foregoing method examples. For example, each function module may be obtained through division based on each corresponding function, or two or more functions may be integrated into one processing module. The foregoing integrated module may be implemented in a form of hardware, or may be implemented in a form of a software function module, or in a form of hardware in combination with software. It should be noted that, in embodiments of this application, module division is an example, and is merely a logical function division. During actual implementation, another division manner may be used.

When each function module is obtained through division based on each corresponding function, FIG. 16 shows a USN. The USN 160 may include a transceiver module 1601 and a processing module 1602. For example, the USN 160 may be a USN, or may be a chip used in the USN, or another combined device, component, or the like that has a function of the USN. When the USN 160 is any USN described above, the transceiver module 1601 may be a transceiver, and the transceiver may include an antenna, a radio frequency circuit, and the like. The processing module 1602 may be a processor (or a processing circuit), for example, a baseband processor, and the baseband processor may include one or more CPUs. When the USN 160 is the component that is configured with the functions of a USN, the transceiver module 1601 may be a radio frequency unit, and the processing module 1602 may be a processor (or a processing circuit), for example, a baseband processor. When the USN 160 is a chip system, the transceiver module 1601 may be an input/output interface of a chip (for example, a baseband chip), and the processing module 1602 may be a processor (or a processing circuit) of the chip system, and may include one or more central processing units. It should be understood that the transceiver module 1601 in this embodiment of this application may be implemented by a transceiver or a transceiver-related circuit component, and the processing module 1602 may be implemented by a processor or a processor-related circuit component (or referred to as a processing circuit).

For example, the transceiver module 1601 may be configured to perform the receiving and sending operations performed by the USN in embodiments shown in FIG. 11 to FIG. 15, such as the foregoing step 1101, step 1102a, step 1102b, step 1103, step 1104, step 1403, step 1404, and step 1405, and/or configured to support another process of the technology described in this specification. The processing module 1602 may be configured to perform the operations except the receiving and sending operations performed by the USN in embodiments shown in FIG. 11 to FIG. 15, such as the foregoing step 1102, and/or configured to support another process of the technology described in this specification.

In another possible implementation, the transceiver module 1601 in FIG. 16 may be replaced with a transceiver, the functions of the transceiver module 1601 may be integrated into the transceiver, the processing module 1602 may be replaced with a processor, and the functions of the processing module 1602 may be integrated into the processor. Further, the USN 160 shown in FIG. 16 may further include a memory. When the transceiver module 1601 is replaced with the transceiver and the processing module 1602 is replaced with the processor, the USN 160 in some embodiments of this application may be the communication apparatus shown in FIG. 10.

Figure 17:
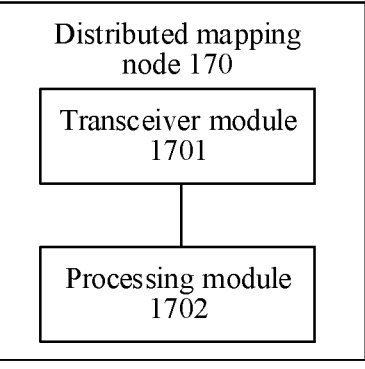
FIG. 17 is a schematic diagram of composition of a distributed mapping node according to an embodiment of this application.

When each function module is obtained through division based on each corresponding function, FIG. 17 shows a distributed mapping node. The distributed mapping node 170 may include a transceiver module 1701 and a processing module 1702. For example, the distributed mapping node 170 may be a distributed mapping node, or may be a chip used in the distributed mapping node, or another combined device, component, or the like that has a function of the distributed mapping node. When the distributed mapping node 170 is the distributed mapping node, the transceiver module 1701 may be a transceiver, and the transceiver may include an antenna, a radio frequency circuit, and the like. The processing module 1702 may be a processor (or a processing circuit), for example, a baseband processor, and the baseband processor may include one or more CPUs. When the distributed mapping node 170 is the component that has the function of the distributed mapping node, the transceiver module 1701 may be a radio frequency unit, and the processing module 1702 may be a processor (or a processing circuit), for example, a baseband processor. When the distributed mapping node 170 is a chip system, the transceiver module 1701 may be an input/output interface of a chip (for example, a baseband chip), and the processing module 1702 may be a processor (or a processing circuit) of the chip system, and may include one or more central processing units. It should be understood that the transceiver module 1701 in some embodiments of this application may be implemented by a transceiver or a transceiver-related circuit component, and the processing module 1702 may be implemented by a processor or a processor-related circuit component (or referred to as a processing circuit).

For example, the transceiver module 1701 may be configured to perform all receiving and sending operations performed by the distributed mapping node in embodiments shown in FIG. 11 to FIG. 15, such as the foregoing step 1102a, step 1102b, and step 1405, and/or configured to support another process of the technology described in this specification. The processing module 1702 may be configured to perform all operations except the receiving and sending operations performed by the distributed mapping node in embodiments shown in FIG. 11 to FIG. 15, such as the foregoing step 1406, and/or configured to support another process of the technology described in this specification.

In another possible implementation, the transceiver module 1701 in FIG. 17 may be replaced with a transceiver, the functions of the transceiver module 1701 may be integrated into the transceiver, the processing module 1702 may be replaced with a processor, and the functions of the processing module 1702 may be integrated into the processor. Further, the distributed mapping node 170 shown in FIG. 17 may further include a memory. When the transceiver module 1701 is replaced with the transceiver and the processing module 1702 is replaced with the processor, the distributed mapping node 170 in some embodiments of this application may be the communication apparatus shown in FIG. 10.

Figure 18:
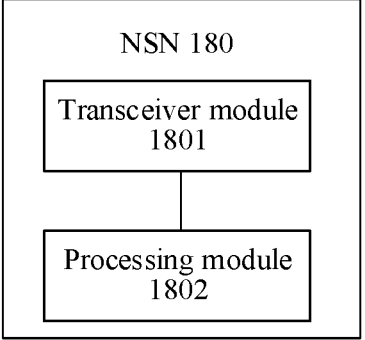
FIG. 18 is a schematic diagram of composition of an NSN according to an embodiment of this application.

When each function module is obtained through division based on each corresponding function, FIG. 18 shows an NSN. The NSN 180 may include a transceiver module 1801 and a processing module 1802. For example, the NSN 180 may be an NSN, or may be a chip used in the NSN, or another combined device, component, or the like that has a function of the NSN. When the NSN 180 is the NSN, the transceiver module 1801 may be a transceiver, and the transceiver may include an antenna, a radio frequency circuit, and the like. The processing module 1802 may be a processor (or a processing circuit), for example, a baseband processor, and the baseband processor may include one or more CPUs. When the NSN 180 is the component that has the function of the NSN, the transceiver module 1801 may be a radio frequency unit, and the processing module 1802 may be a processor (or a processing circuit), for example, a baseband processor. When the NSN 180 is a chip system, the transceiver module 1801 may be an input/output interface of a chip (for example, a baseband chip), and the processing module 1802 may be a processor (or a processing circuit) of the chip system, and may include one or more central processing units. It should be understood that the transceiver module 1801 in this embodiment of this application may be implemented by a transceiver or a transceiver-related circuit component, and the processing module 1802 may be implemented by a processor or a processor-related circuit component (or referred to as a processing circuit).

For example, the transceiver module 1801 may be configured to perform all receiving and sending operations performed by the NSN in embodiments shown in FIG. 11 to FIG. 15, such as the foregoing step 1403, and/or configured to support another process of the technology described in this specification. The processing module 1802 may be configured to perform all operations except the receiving and sending operations performed by the NSN in embodiments shown in FIG. 11 to FIG. 15, such as the foregoing step 1402, and/or configured to support another process of the technology described in this specification.

In another possible implementation, the transceiver module 1801 in FIG. 18 may be replaced with a transceiver, the functions of the transceiver module 1801 may be integrated into the transceiver, the processing module 1802 may be replaced with a processor, and the functions of the processing module 1802 may be integrated into the processor. Further, the NSN 180 shown in FIG. 18 may further include a memory. When the transceiver module 1801 is replaced with the transceiver and the processing module 1802 is replaced with the processor, the NSN 180 in this embodiment of this application may be the communication apparatus shown in FIG. 10.

An embodiment of this application further provides a computer-readable storage medium. All or some of the procedures in the foregoing method embodiments may be implemented by a computer program instructing related hardware. The program may be stored in the computer-readable storage medium. When the program is executed, the procedures of the foregoing method embodiments may be included. The computer-readable storage medium may be an internal storage unit of a terminal (including a data transmitting end and/or a data receiving end) in any one of the foregoing embodiments, for example, a hard disk or a memory of the terminal. Alternatively, the computer-readable storage medium may be an external storage device of the terminal, for example, a plug-in hard disk, a smart media card (SMC), a secure digital (SD) card, a flash card (flash card), or the like that are configured on the terminal. Further, the computer-readable storage medium may alternatively include both of the internal storage unit and the external storage device of the terminal. The computer-readable storage medium is configured to store the computer program and another program and data that are required by the terminal. The computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular sequence. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural.

The foregoing descriptions of implementations allow a person skilled in the art to understand that, for the purpose of convenient and brief description, division of the foregoing function modules is used as an example for illustration. During actual application, the foregoing functions can be allocated to different modules and implemented based on a requirement, in other words, an inner structure of an apparatus is divided into different function modules to implement all or some of the functions described above.

In several embodiments provided in this application, it should be understood that the disclosed apparatus and method may be implemented in another manner. For example, the described apparatus embodiment is merely an example. For example, division into the modules or units is merely logical function division and there may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, in other words, may be located in one place, or may be distributed in different places. Some or all of the units may be selected based on an actual requirement to achieve the objectives of the solutions of embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit, or in a form of hardware combined with software.

When the integrated unit is implemented in the form of the software function unit and sold or used as an independent product, the integrated unit may be stored in a readable storage medium. Based on such an understanding, the technical solutions in embodiments of this application, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
receiving, by a first user service node (USN), first information from a first terminal device, wherein the first USN belongs to a first group of USNs deployed on a first edge cloud, the first group of USNs form a hash ring corresponding to the first edge cloud, and the first information comprises identification information of a second terminal device;
determining, by the first USN based on the identification information of the second terminal device, identification information of a USN corresponding to the second terminal device; and
when the USN corresponding to the second terminal device is a second USN, sending, by the first USN, the first information to the second USN through the hash ring corresponding to the first edge cloud, wherein the second USN belongs to the first group of USNs; and
when the USN corresponding to the second terminal device is a third USN, sending, by the first USN, the first information to the third USN through a channel between the first edge cloud and a second edge cloud and a hash ring corresponding to the second edge cloud, wherein the third USN belongs to a second group of USNs deployed on the second edge cloud, and the second group of USNs form the hash ring corresponding to the second edge cloud.

2. The method according to claim 1, wherein the determining, based on the identification information of the second terminal device, of the identification information of the USN corresponding to the second terminal device comprises:
determining, by the first USN based on prestored information about one or more USNs, the identification information of the USN corresponding to the second terminal device, wherein the prestored information about the USN comprises the identification information of the second terminal device and the identification information of the USN corresponding to the second terminal device.

3. The method according to claim 1, wherein the determining, based on the identification information of the second terminal device, of the identification information of the USN corresponding to the second terminal device comprises:
sending, by the first USN, request information to a distributed mapping node, wherein the request information comprises the identification information of the second terminal device, the request information requests the identification information of the USN corresponding to the second terminal device, and the distributed mapping node belongs to a mapping system; and
receiving, by the first USN, a response message from the distributed mapping node, wherein the response message comprises the identification information of the USN corresponding to the second terminal device.

4. The method according to claim 1, wherein
the identification information of the USN corresponding to the second terminal device comprises first identification information and second identification information, wherein the first identification information indicates information about an edge cloud to which the USN belongs, and the second identification information indicates identity information of the USN.

5. The method according to claim 1, wherein the sending of the first information to the third USN through the channel between the first edge cloud and the second edge cloud and a hash ring corresponding to the second edge cloud comprises:
sending, by the first USN, the first information to the USN on the second edge cloud through the channel between the first edge cloud and the second edge cloud, to enable the USN on the second edge cloud to send the first information to the third USN through the hash ring corresponding to the second edge cloud.

6. The method according to claim 1, wherein the method further comprises:
obtaining, by the first USN, identification information of a fourth USN, wherein the fourth USN is a USN to which the first terminal device is handed over, and the fourth USN belongs to the second group of USNs; and
sending, by the first USN, user information of the first terminal device to the fourth USN through the channel between the first edge cloud and the second edge cloud and the hash ring corresponding to the second edge cloud.

7. A communication apparatus, wherein the communication apparatus comprises at least one processor, when the at least one processor runs a computer program or instructions, the computer program or instructions cause the communication apparatus to:
receive by a first user service node (USN) first information from a first terminal device, wherein the first USN belongs to a first group of USNs deployed on a first edge cloud, the first group of USNs form a hash ring corresponding to the first edge cloud, and the first information comprises identification information of a second terminal device;

determine based on the identification information of the second terminal device, identification information of a USN corresponding to the second terminal device; and when the USN corresponding to the second terminal device is a second USN, send the first information to the second USN through the hash ring corresponding to the first edge cloud, wherein the second USN belongs to the first group of USNs; and when the USN corresponding to the second terminal device is a third USN, sending the first information to the third USN through a channel between the first edge cloud and a second edge cloud and a hash ring corresponding to the second edge cloud, wherein the third USN belongs to a second group of USNs deployed on the second edge cloud, and the second group of USNs form the hash ring corresponding to the second edge cloud.

8. The communication apparatus according to claim 7, wherein the determining of the identification information of the USN corresponding to the second terminal device comprises:

determining, based on prestored information about one or more USNs, the identification information of the USN corresponding to the second terminal device, wherein the information about the USN comprises the identification information of the second terminal device and the identification information of the USN corresponding to the second terminal device.

9. The communication apparatus according to claim 7, wherein the determining, based on the identification information of the second terminal device, of the identification information of the USN corresponding to the second terminal device comprises:

sending request information to a distributed mapping node, wherein the request information comprises the identification information of the second terminal device, the request information requests the identification information of the USN corresponding to the second terminal device, and the distributed mapping node belongs to a mapping system; and receiving a response message from the distributed mapping node, wherein the response message comprises the identification information of the USN corresponding to the second terminal device.

10. The communication apparatus according to claim 7, wherein the identification information of the USN corresponding to the second terminal device comprises first identification information and second identification information, wherein the first identification information indicates information about an edge cloud to which the USN belongs, and the second identification information indicates identity information of the USN.

11. The communication apparatus according to claim 7, wherein the sending of the first information to the third USN through a channel between the first edge cloud and the second edge cloud and the hash ring corresponding to the second edge cloud comprises:

sending the first information to the USN on the second edge cloud through the channel between the first edge cloud and the second edge cloud, to enable the USN on the second edge cloud to send the first information to the third USN through the hash ring corresponding to the second edge cloud.

12. The communication apparatus according to claim 7, wherein the communication apparatus is further caused to:

obtain identification information of a fourth USN, wherein the fourth USN is a USN to which the first terminal device is handed over, and the fourth USN belongs to the second group of USNs; and send user information of the first terminal device to the fourth USN through the channel between the first edge cloud and the second edge cloud and the hash ring corresponding to the second edge cloud.

13. A non-transitory computer-readable medium storing a computer program, wherein, when the computer program is executed by a computing device, the computer program causes the computing device to:

receive, by a first user service node (USN), first information from a first terminal device, wherein the first USN belongs to a first group of USNs deployed on a first edge cloud, the first group of USNs form a hash ring corresponding to the first edge cloud, and the first information comprises identification information of a second terminal device;

determine, by the first USN based on the identification information of the second terminal device, identification information of a USN corresponding to the second terminal device; and when the USN corresponding to the second terminal device is a second USN, sending, by the first USN, the first information to the second USN through the hash ring corresponding to the first edge cloud, wherein the second USN belongs to the first group of USNs; and when the USN corresponding to the second terminal device is a third USN, sending, by the first USN, the first information to the third USN through a channel between the first edge cloud and a second edge cloud and a hash ring corresponding to the second edge cloud, wherein the third USN belongs to a second group of USNs deployed on the second edge cloud, and the second group of USNs form the hash ring corresponding to the second edge cloud.

14. The non-transitory computer-readable medium of claim 13, wherein the determination, based on the identification information of the second terminal device, of the identification information of the USN corresponding to the second terminal device comprises:

determining, by the first USN based on prestored information about one or more USNs, the identification information of the USN corresponding to the second terminal device, wherein the prestored information about the USN comprises the identification information of the second terminal device and the identification information of the USN corresponding to the second terminal device.

15. The non-transitory computer-readable medium of claim 13, wherein the determination, based on the identification information of the second terminal device, of the identification information of the USN corresponding to the second terminal device comprises:

sending, by the first USN, request information to a distributed mapping node, wherein the request information comprises the identification information of the second terminal device, the request information requests the identification information of the USN corresponding to the second terminal device, and the distributed mapping node belongs to a mapping system; and receiving, by the first USN, a response message from the distributed mapping node, wherein the response message comprises the identification information of the USN corresponding to the second terminal device.

16. The non-transitory computer-readable medium of claim 13, wherein the identification information of the USN corresponding to the second terminal device comprises first identification information and second identification information, wherein the first identification information indicates information about an edge cloud to which the USN belongs, and the second identification information indicates identity information of the USN.

17. The non-transitory computer-readable medium of claim 13, wherein the sending of the first information to the third USN through the channel between the first edge cloud and the second edge cloud and a hash ring corresponding to the second edge cloud comprises:

sending, by the first USN, the first information to the USN on the second edge cloud through the channel between the first edge cloud and the second edge cloud, to enable the USN on the second edge cloud to send the first information to the third USN through the hash ring corresponding to the second edge cloud.

18. The non-transitory computer-readable medium of claim 13, wherein, when being executed by the computing device, the computer program further causes the computing device to:

obtain, by the first USN, identification information of a fourth USN, wherein the fourth USN is a USN to which the first terminal device is handed over, and the fourth USN belongs to the second group of USNs; and send, by the first USN, user information of the first terminal device to the fourth USN through the channel between the first edge cloud and the second edge cloud and the hash ring corresponding to the second edge cloud.

* * * * *